(12) United States Patent
Fujioka et al.

(10) Patent No.: US 10,293,730 B2
(45) Date of Patent: May 21, 2019

(54) SEAT RECLINING APPARATUS

(71) Applicants: SHIROKI CORPORATION, Fujisawa-shi, Kanagawa (JP); NHK SPRING CO., LTD., Yokohama-shi, Kanagawa (JP)

(72) Inventors: Hidehiko Fujioka, Fujisawa (JP); Norihisa Nozue, Fujisawa (JP); Masaaki Nonomiya, Yokohama (JP)

(73) Assignees: SHIROKI CORPORATION, Fujisawa-Shi, Kanagawa (JP); NHK SPRING CO., LTD., Yokohama-Shi, Kanagawa (JP)

( * ) Notice: Subject to any disclaimer, the term of this patent is extended or adjusted under 35 U.S.C. 154(b) by 0 days.

(21) Appl. No.: 15/907,816

(22) Filed: Feb. 28, 2018

(65) Prior Publication Data

US 2018/0281651 A1    Oct. 4, 2018

(30) Foreign Application Priority Data

Mar. 28, 2017    (JP) .................................. 2017-062791

(51) Int. Cl.
  *B60N 2/20* (2006.01)
  *B60N 2/22* (2006.01)
  *B60N 2/90* (2018.01)

(52) U.S. Cl.
  CPC .............. *B60N 2/933* (2018.02); *B60N 2/20* (2013.01); *B60N 2/22* (2013.01); *B60N 2002/971* (2018.02)

(58) Field of Classification Search
  CPC . B60N 2/933; B60N 2/22; B60N 2/20; B60N 2002/971

USPC ......................... 297/378.12, 378.14
See application file for complete search history.

(56) References Cited

U.S. PATENT DOCUMENTS

| | | | | |
|---|---|---|---|---|
| 4,146,267 A | * | 3/1979 | Mori .................... | B60N 2/2352 |
| | | | | 297/378.12 X |
| 4,268,086 A | * | 5/1981 | Okuyama .............. | B60N 2/206 |
| | | | | 297/378.12 X |
| 4,382,630 A | * | 5/1983 | Weston ................ | B60N 2/2352 |
| | | | | 297/378.12 X |
| 4,466,661 A | * | 8/1984 | Narita .................. | B60N 2/2354 |
| | | | | 297/378.12 X |

(Continued)

FOREIGN PATENT DOCUMENTS

JP    2015-226565 A    12/2015

*Primary Examiner* — Rodney B White
(74) *Attorney, Agent, or Firm* — Buchanan Ingersoll & Rooney PC

(57) ABSTRACT

A seat reclining apparatus includes: first and second reclining lock mechanisms that operate in a locked state and an unlocked state, where the locked state prevents a seat back from tilting and the unlocked state allows the tilting; a first rotation member that rotates toward an unlocking direction integrally with the shaft body to change the first reclining lock mechanism from the locked state to the unlocked state; and a second rotation member that is operated to rotate by an operation member toward the unlocking direction to change the second reclining lock mechanism from the locked state to the unlocked state via a cable. When the operation member is operated, the second rotation member rotates from the locking position toward the unlocking direction by a predetermined amount, subsequently transmits a rotation force to the first rotation member toward the unlocking direction via an interlocking portion.

4 Claims, 14 Drawing Sheets

(56) References Cited

U.S. PATENT DOCUMENTS

| | | | | |
|---|---|---|---|---|
| 4,717,204 A * | 1/1988 | Tezuka | B60N 2/2251 | 297/378.12 X |
| 5,383,710 A * | 1/1995 | Premji | B60N 2/20 | 297/378.12 X |
| 5,419,616 A * | 5/1995 | Paetzold | B60N 2/20 | 297/378.12 X |
| 5,522,643 A * | 6/1996 | Matsuura | B60N 2/2354 | 297/378.12 X |
| 5,597,206 A * | 1/1997 | Ainsworth | B60N 2/0705 | 297/378.12 X |
| 6,152,533 A * | 11/2000 | Smuk | B60N 2/12 | 297/378.12 X |
| 6,402,249 B1 * | 6/2002 | Rohee | B60N 2/20 | 297/378.12 X |
| 6,659,557 B2 * | 12/2003 | Deptolla | B60N 2/2354 | 297/378.12 X |
| 6,739,668 B2 * | 5/2004 | Coman | B60N 2/206 | 297/378.12 |
| 7,328,954 B2 * | 2/2008 | Sasaki | B60N 2/12 | 297/378.12 X |
| 7,490,907 B2 * | 2/2009 | Nagura | B60N 2/20 | 297/378.12 X |
| 7,578,556 B2 * | 8/2009 | Ohba | B60N 2/20 | 297/378.12 X |
| 7,686,398 B2 * | 3/2010 | Yokoyama | B60N 2/12 | 297/378.12 X |
| 7,828,382 B2 * | 11/2010 | Ozeki | B60N 2/20 | 297/378.12 X |
| 7,857,392 B2 * | 12/2010 | Hayakawa | B60N 2/206 | 297/378.12 X |
| 8,038,217 B2 * | 10/2011 | Yamagishi | B60N 2/06 | 297/378.12 X |
| 8,061,776 B2 * | 11/2011 | Gi | B60N 2/01508 | 297/378.12 X |
| 8,141,954 B2 * | 3/2012 | Kumazaki | B60N 2/3065 | 297/378.12 X |
| 8,167,372 B2 * | 5/2012 | Hazlewood | B60N 2/0705 | 297/378.14 X |
| 8,360,528 B2 * | 1/2013 | Shinohara | B60N 2/01583 | 297/378.12 X |
| 8,376,459 B2 * | 2/2013 | Kumazaki | B60N 2/12 | 297/378.12 X |
| 8,439,444 B2 * | 5/2013 | Ngiau | B60N 2/12 | 297/378.12 |
| 8,931,845 B2 * | 1/2015 | Otsuka | B60N 2/062 | 297/378.12 X |
| 8,985,691 B2 * | 3/2015 | Tsuruta | B60N 2/2356 | 297/378.12 X |
| 9,010,862 B2 * | 4/2015 | Yamaguchi | B60N 2/68 | 297/378.12 X |
| 2003/0080601 A1 * | 5/2003 | Charras | B60N 2/206 | 297/378.12 |
| 2003/0102705 A1 * | 6/2003 | Pejathaya | B60N 2/01583 | 297/378.12 |
| 2003/0127898 A1 * | 7/2003 | Niimi | B60N 2/206 | 297/378.12 X |
| 2004/0021355 A1 * | 2/2004 | Ohba | B60N 2/06 | 297/341 |
| 2004/0262969 A1 * | 12/2004 | Sasaki | B60N 2/0705 | 297/378.12 X |
| 2005/0006940 A1 * | 1/2005 | Yoshida | B60N 2/065 | 297/378.12 |
| 2005/0104433 A1 * | 5/2005 | Ganot | B60N 2/08 | 297/378.12 |
| 2007/0018492 A1 * | 1/2007 | Becker | B60N 2/20 | 297/378.12 |
| 2007/0040437 A1 * | 2/2007 | Nagura | B60N 2/20 | 297/367 R |
| 2007/0090674 A1 * | 4/2007 | Miyauchi | B60N 2/20 | 297/378.12 |
| 2009/0096270 A1 * | 4/2009 | Halbig | B60N 2/12 | 297/378.12 |
| 2009/0218870 A1 * | 9/2009 | Kawamura | B60N 2/20 | 297/367 R |
| 2010/0109404 A1 * | 5/2010 | Yamagishi | B60N 2/06 | 297/341 |
| 2011/0127822 A1 * | 6/2011 | Moegling | B60N 2/12 | 297/378.12 |
| 2012/0228913 A1 * | 9/2012 | Hurst | B60N 2/12 | 297/354.12 |
| 2012/0261964 A1 * | 10/2012 | Yamaguchi | B60N 2/12 | 297/378.14 |
| 2014/0145485 A1 * | 5/2014 | Couasnon | B60N 2/20 | 297/378.12 |
| 2014/0300160 A1 * | 10/2014 | Shigematsu | B60N 2/16 | 297/338 |
| 2016/0016486 A1 * | 1/2016 | Aktas | B60N 2/12 | 297/378.12 |
| 2018/0050616 A1 * | 2/2018 | Nozue | B60N 2/933 | |

* cited by examiner

SEAT RECLINING APPARATUS

BACKGROUND OF THE INVENTION

1. Field of the Invention

The present invention relates to a seat reclining apparatus of a vehicle seat.

2. Description of the Related Art

Seat reclining apparatuses that make vehicle seats support seat backs to enable reclining (angular adjustment) include a type of seat reclining apparatuses that are provided with reclining lock mechanisms on both sides of a seat width direction. The seat reclining apparatus of this type interlocks the reclining lock mechanisms on the both sides via rods extending in the seat width direction or cables having flexibility. This type of seat reclining apparatus is disclosed in, e.g., Japanese Unexamined Patent Publication No. 2015-226565.

A conventional seat reclining apparatus does not appropriately interlock reclining lock mechanisms on both sides in some cases. For example, there is a risk that, when an operation of unlocking the reclining lock mechanism on one side is performed via operation member such as a lock release handle, an operation failure that the other reclining lock mechanism that is not directly connected with the operation member does not appropriately perform the unlocking operation (the unlocking operation is significantly delayed or unlocking is not performed in a range of an operation amount of the operation member) occurs. Particularly when the reclining lock mechanisms on the both sides are interlocked by using a connection member such as a cable having flexibility, a condition such as a warp amount of the connection member is likely to vary. Therefore, there is a problem that a driven side reclining lock mechanism is hardly interlocked reliably.

SUMMARY OF THE INVENTION

The present invention has been devised in view of the above described problem and provides a seat reclining apparatus that can appropriately interlock a plurality of reclining lock mechanisms provided to seats.

A seat reclining apparatus according to the present invention includes: a first reclining lock mechanism and a second reclining lock mechanism that operate in a locked state and an unlocked state, the locked state preventing a seat back from tilting with respect to a seat cushion and the unlocked state allowing the seat back to tilt with respect to the seat cushion; a first rotation member that connects with the first reclining lock mechanism via a shaft body interposed therebetween, and rotates from a locking position toward an unlocking direction together with the shaft body to change the first reclining lock mechanism from the locked state to the unlocked state; and a second rotation member that is operated to rotate by an operation member, and rotates from the locking position toward the unlocking direction to change the second reclining lock mechanism from the locked state to the unlocked state via a cable, the second rotation member is provided with an interlocking portion, and when the operation member is operated, the second rotation member rotates from the locking position toward the unlocking direction by a predetermined amount, subsequently transmits a rotation force to the first rotation member via the interlocking portion to rotate the first rotation member toward the unlocking direction.

The second rotation member is preferably supported relatively rotatably with respect to the shaft body that rotates integrally with the first rotation member. The first rotation member and the second rotation member are coaxially supported in this way. Consequently, it is possible to improve space efficiency and operation efficiency of rotation transmission.

Preferably, the seat reclining apparatus according further includes a force transmission portion that is provided to the first rotation member and to which the rotation force in unlocking direction is transmitted from the interlocking portion, and when the first rotation member and the second rotation member are at the locking positions, respectively, the force transmission portion is apart from the interlocking portion.

As described above, according to the seat reclining apparatus according to the present invention, when the second rotation member operated to rotate by the operation member rotates from the locking position toward the unlocking direction by the predetermined amount, the rotation force transmits to the first rotation member. Consequently, the first reclining lock mechanism and the second reclining lock mechanism to which an operation force in the unlocking direction is transmitted under different conditions (connection members and force transmission routes) can be interlocked at an appropriate timing, and reliably perform unlocking.

The present disclosure relates to subject matter contained in Japanese Patent Application No. 2017-062791 (filed on Mar. 28, 2017) which is expressly incorporated herein by reference in its entirety.

DESCRIPTION OF THE EMBODIMENTS

Figure 1:
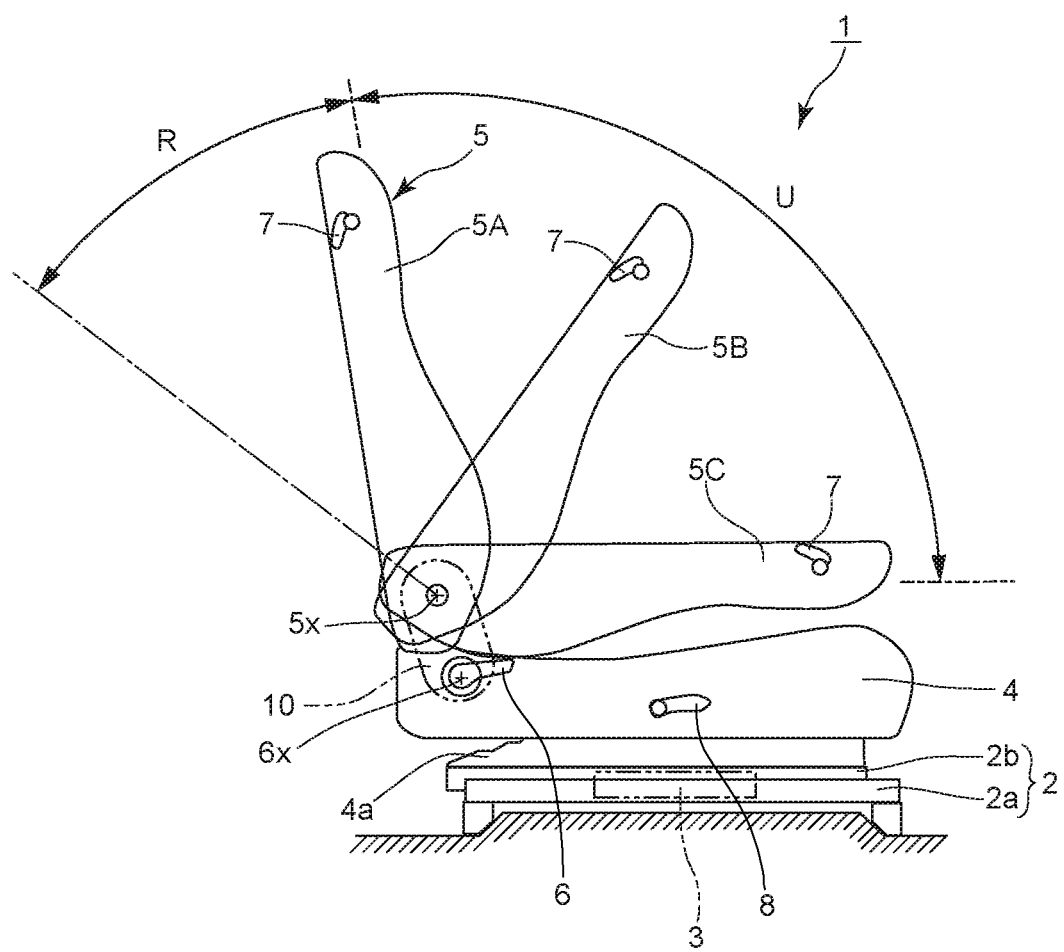
FIG. 1 is a side view of a vehicle seat.

A vehicle seat (reclining seat) 1 illustrated in FIG. 1 is movably supported in forward and rearward directions of a vehicle via a seat track 2. The seat track 2 includes two sets of rails: a pair of lower rails 2a (only one of which can be seen in FIG. 1) that are fixed to a vehicle floor, and a pair of upper rails 2b (only one of which can be seen in FIG. 1) that are slidable in the forward and rearward directions with respect to the pair of lower rails 2a. With a slide-lock mechanism 3 that is conceptually shown in FIG. 1, the seat track 2 can be brought into the following two states: a slide locked state where the pair of upper rails 2b are prevented from sliding with respect to the pair of lower rails 2a, and a slide permitted state where the pair of upper rails 2b are slidable with respect to the pair of lower rails 2a. A known slide-lock mechanism can be adopted as the slide-lock mechanism 3, so that the detailed description of the slide-lock mechanism 3 will be omitted. The vehicle seat 1 is biased to slide forward by a seat slide spring (not shown).

The vehicle seat 1 includes a seat cushion 4 that is a seat portion, and a seat back 5 that is a backrest portion. A seat cushion frame 4a (partially illustrated in FIG. 1) that constitutes the seat cushion 4 is supported on the pair of upper rails 2b fixedly. The seat back 5 is pivotally supported near a rear end of the seat cushion 4 so as to be tiltable (rotatable) in the forward and rearward directions via a seat reclining apparatus 10 and a seat reclining apparatus 70 described later. FIG. 1 schematically illustrates a rotation center 5x, about which the seat back 5 rotates (tilts).

According to the seat reclining apparatuses 10 and 70, a reclining lock mechanism (first reclining lock mechanism) 14 and a reclining lock mechanism (second reclining lock mechanism) 74 described below can operate and hold (lock reclining of) the seat back 5 at an arbitrary angular position in a reclining range (locking range) R illustrated in FIG. 1. A position at which a reclining angle of the seat back 5 is minimum (at which the seat back 5 stands in upright position) in the reclining range R refers to an initial locking position 5A. The seat reclining apparatuses 10 and 70 bias the seat back 5 in a forward-tilt direction (a clockwise direction in FIG. 1). On unlocking each reclining lock mechanism 14 and 71, the seat back 5 tilts forward beyond the initial locking position 5A. The tilting range of the seat back 5 which is set from the initial locking position 5A forward is set as an unlocking range U in which the reclining lock mechanisms 14 and 74 are maintained in a non-operation state (in which each reclining lock mechanism 14 and 71 does not lock the seat back 5).

As illustrated in FIG. 1, a lock release handle (operation member) 6 is arranged on a side of the seat cushion 4, and can be operated to rotate about a rotation center 6x located below the rotation center 5x of the seat back 5. The seat back 5 is provided with a walk-in operation lever (operation member) 7. Furthermore, a fold-down operation lever 8 is arranged on the side of the seat cushion 4 and at a different position from the lock release handle 6. By manually operating the lock release handle 6 and the walk-in operation lever 7, it is possible to unlock the reclining lock of the reclining lock mechanisms 14 and 74, and tilt the seat back 5 forward to an intermediate stop position 5B in the unlocking range U. Furthermore, by manually operating the fold-down operation lever 8, it is possible to tilt the seat back 5 further forward to a folded-down position 5C at which a back surface of the seat back 5 becomes substantially horizontal. The operations of the seat back 5 to each of these positions will be described below.

Figure 2:
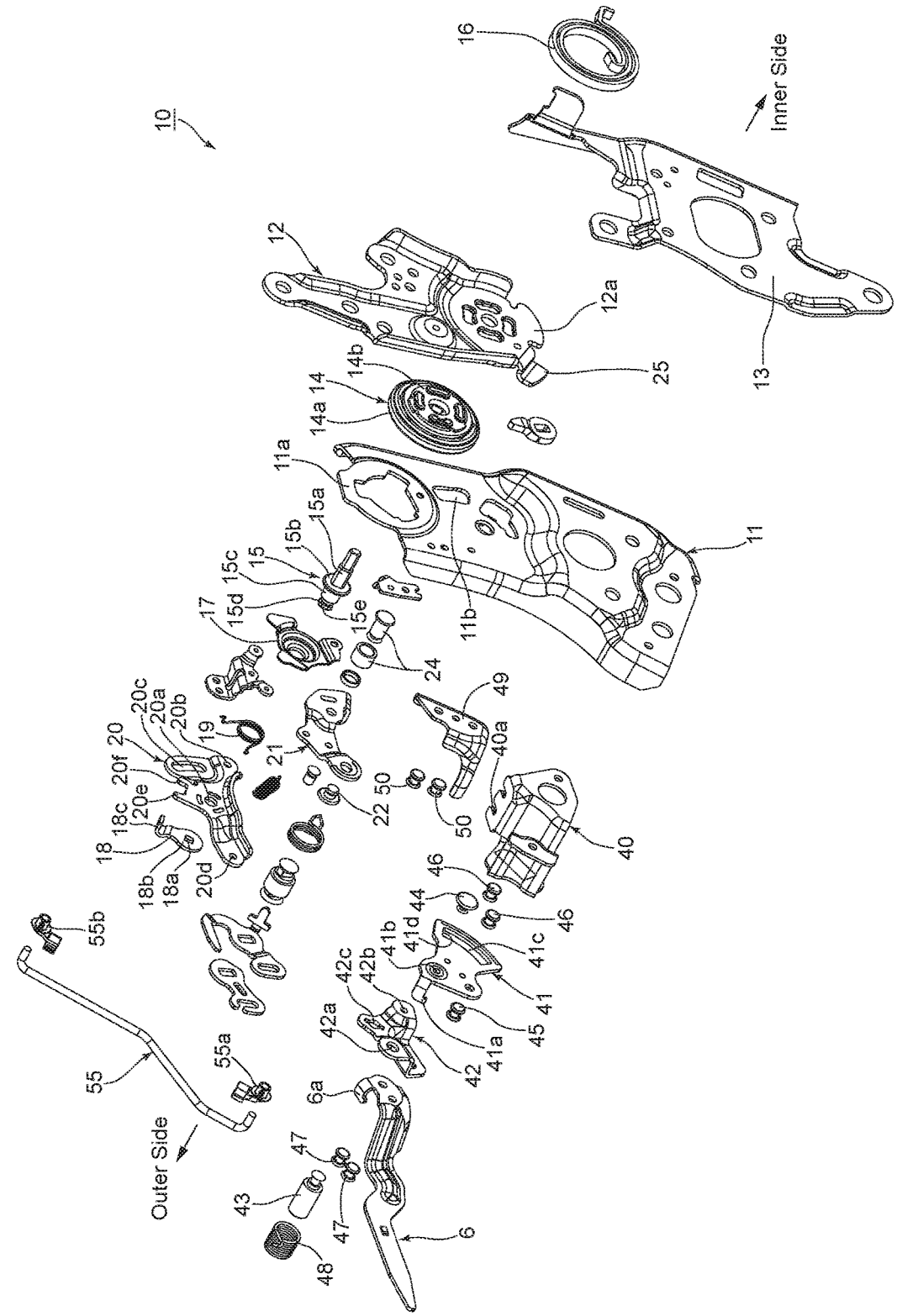
FIG. 2 is an exploded perspective view of a seat reclining apparatus arranged on an outer side of the vehicle seat.

The details of the seat reclining apparatuses will be described with reference to FIG. 2 onward. The seat reclining apparatuses are arranged one by one on both sides of a width direction of the vehicle seat 1. The seat reclining apparatus 10 illustrated in FIGS. 2 to 4, 6, 8, 10, 12 and 13 is a right one when seen from a traveling direction of the vehicle seat 1 in FIG. 1, and includes the lock release handle 6. Furthermore, operations of the walk-in operation lever 7 and the fold-down operation lever 8 are also input to the seat reclining apparatus 10. The seat reclining apparatus 70 illustrated in FIGS. 5, 7, 9 and 11 is a left one when seen from the traveling direction of the vehicle seat 1 in FIG. 1, does not include an operation member such as the lock release handle 6 that receives an input of an operation from an outside, and operates interlocking with the seat reclining apparatus 10. The term "outer side" in the following description corresponds to a right-hand side (an outer side of a vehicle) of the vehicle seat 1 provided with the seat reclining apparatus 10. The term "inner side" corresponds to a left-hand side (an inner side of the vehicle) of the vehicle seat 1 provided with the seat reclining apparatus 70.

Figure 3:
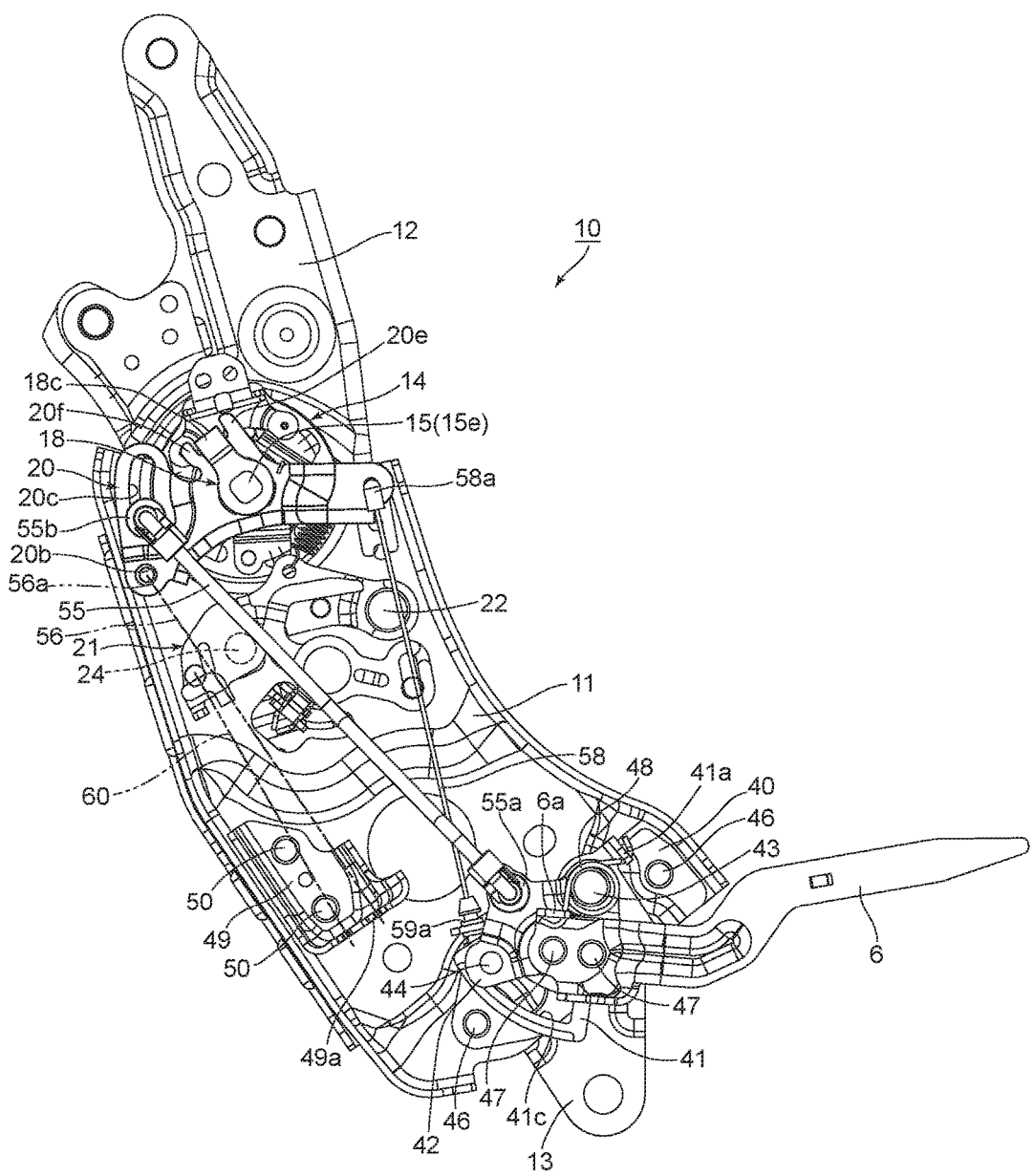
FIG. 3 is a side view illustrating from the outer side the outer side seat reclining apparatus in a state where a seat back is in a reclining range.

FIG. 3 illustrates the outer side seat reclining apparatus 10 from the outer side. FIGS. 4, 6, 8, 10, 12 and 13 illustrate the outer side seat reclining apparatus 10 from the inner side. FIGS. 5, 7, 9 and 11 illustrate the inner side seat reclining apparatus 70 from the inner side. In addition, in FIGS. 4, 6, 8, 10, 12 and 13, a linking lever 18 and an open plate (second rotation member) 20, which are located at a back (outer side) of a lower bracket 11 and an upper bracket 12 therefore cannot be directly viewed from the inner side, are indicated by solid lines instead of broken lines.

As illustrated in FIG. 2, the outer side seat reclining apparatus 10 is provided with the lower bracket 11 that is supported fixedly on the seat cushion 4, and the upper bracket 12 that is supported fixedly on the seat back 5. The lower bracket 11 is fixed to a vicinity of a rear end of the seat cushion frame 4a (FIG. 1) with a support plate 13 interposed therebetween. The reclining lock mechanism 14 is arranged between the lower bracket 11 and the upper bracket 12.

The reclining lock mechanism 14 is a round type reclining lock mechanism. A configuration of reclining lock mechanism 14 is known and therefore will be briefly described. A base plate 14a and a ratchet plate 14b having disk shapes are combined to be able to relatively rotate. The base plate 14a is welded and fixed to a fastening portion 11a located near an upper end of the lower bracket 11. The ratchet plate 14b is welded and fixed to a fastening portion 12a located near a lower end of the upper bracket 12. The rotation center of relative rotation between the base plate 14a and the ratchet plate 14b is coincident with the rotation center 5x of the seat back 5 illustrated in FIG. 1.

A plurality of lock members (not shown) that are movable in a radial direction whose center is the rotation center 5x, and a cam member (not shown) that rotates about the rotation center 5x are disposed between the base plate 14a and the ratchet plate 14b. Each lock member is prevented from moving in a rotational direction with respect to the base plate 14a. The cam member rotates integrally with a hinge pin (shaft body) 15 inserted in the center (on the rotation center 5x) of the base plate 14a and the ratchet plate 14b. Variation of the position of the cam member in the rotational direction thereof causes the radial position of each lock member to vary. Upon each lock member moving radially outward, the outer teeth formed on each lock member enmesh with the inner teeth formed on the ratchet plate 14b to prevent the relative rotation of the base plate 14a and the ratchet plate 14b. A lock biasing spring (not shown) built in the reclining lock mechanism 14 biases the cam member in a locking direction in which the outer teeth of the lock members enmesh with the inner teeth of the ratchet plate 14b. Therefore, unless operated from the outside, the reclining lock mechanism 14 maintains a locked state where the upper bracket 12 is prevented from tilting with respect to the lower bracket 11. When the lock members move radially inward and the outer teeth of the lock members are disengaged from the inner teeth of the ratchet plate 14b, the reclining lock mechanism 14 changes from the locked state to an unlocked state where the upper bracket 12 is tiltable with respect to the lower bracket 11.

The upper bracket 12 is biased in the forward-tilt direction (toward the intermediate stop position 5B or the folded-down position 5C) by a forward-tilt biasing spring 16 illustrated in FIG. 2. The forward-tilt biasing spring 16 is a spiral spring including one end that engages with the upper bracket 12, and the other end that engages with the support plate 13.

As illustrated in FIG. 2, the hinge pin 15 includes a non-circular cross-sectional portion 15a, a flange portion 15b, a circular cross-sectional portion 15c, a non-circular cross-sectional portion 15d and a head portion 15e in order from the inner side. The non-circular cross-sectional portion 15a fits to a lock member (not shown) of the above-described reclining lock mechanism 14. The lock member and the hinge pin 15 integrally rotate about the rotation center 5x. The flange portion 15b comes into contact with a surface on the outer side of the base plate 14a, and determines a position of the hinge pin 15 in an axial direction.

Figure 14:
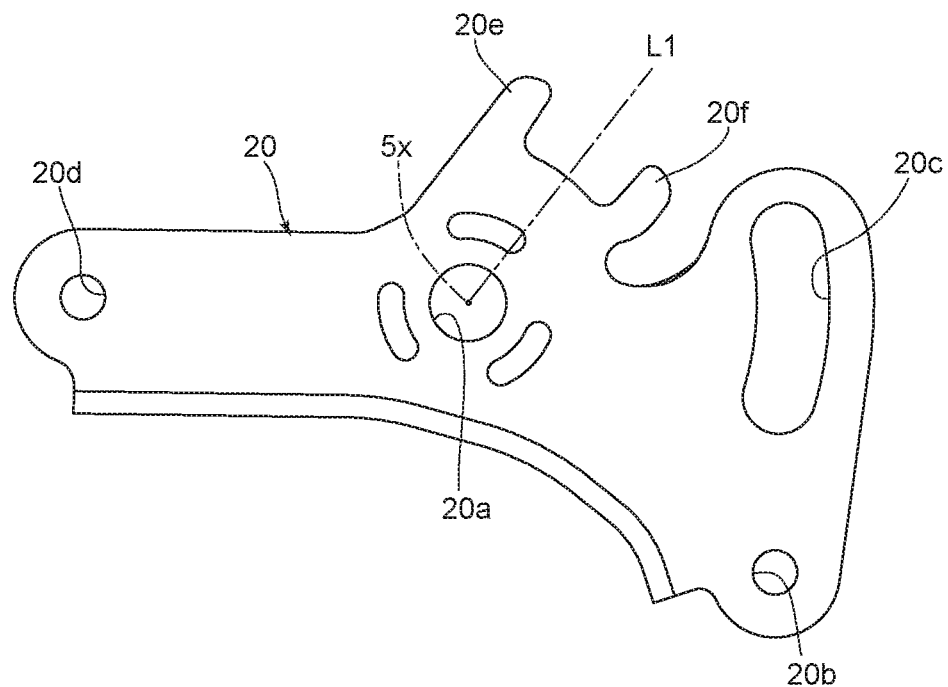
FIG. 14 is a plan view illustrating from the inner side an open plate that constitutes the outer side seat reclining apparatus.

The open plate 20 is arranged on the outer side of the lower bracket 11 and is rotatably supported by the hinge pin 15. As illustrated in FIGS. 2 and 14, the open plate 20 is provided with a circular hole 20a near a center in a longitudinal direction, a cable connection hole 20b and an arc hole 20c near one end in the longitudinal direction, and a cable connection hole 20d near the other end in the longitudinal direction. A surface on the inner side of the open plate 20 is in contact with a support base 17 (FIG. 2) fixed to the lower bracket 11. The circular cross-sectional portion 15c of the hinge pin 15 is protruding through a through-hole formed in the support base 17 and is inserted in the circular hole 20a. Accordingly, the open plate 20 is supported relatively rotatably with respect to the hinge pin 15. The arc hole 20c is an elongate hole extending in a circumferential direction about a center axis (rotation center 5x) of the hinge pin 15 inserted in the circular hole 20a.

As illustrated in FIGS. 2 and 14, the open plate 20 further includes a rotation transmission portion (interlocking portion) 20e and a return regulating portion 20f that protrude from the vicinity of the circular hole 20a toward the outer diameter direction. The rotation transmission portion 20e and the return regulating portion 20f are arranged at a predetermined interval in the rotational direction of the open plate 20 whose center is the rotation center 5x (the center of the circular hole 20a), and include facing surfaces that are substantially symmetrical with respect to a virtual line L1 (see FIG. 14) extending from the rotation center 5x toward the radial direction.

Figure 15:
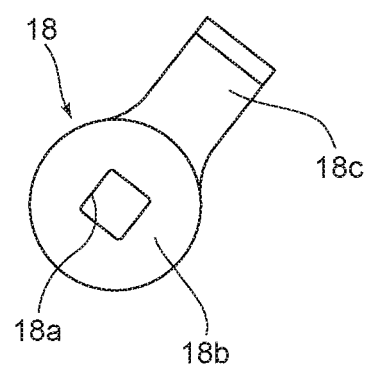
FIG. 15 is a plan view illustrating from the inner side a linking lever that constitutes the outer side seat reclining apparatus.

The linking lever (first rotation member) 18 is arranged at a position adjacent to the outer side of the open plate 20. As illustrated in FIGS. 2 and 15, the linking lever 18 is provided with a center portion 18b at which a rectangular and non-circular hole 18a is formed, and a transmission arm (force transmission portion) 18c that protrudes from the center portion 18b toward the radial direction. The non-circular cross-sectional portion 15d of the hinge pin 15 is inserted in the non-circular hole 18a, and the hinge pin 15 and the linking lever 18 are coupled to integrally rotate about the rotation center 5x together. The head portion 15e of the hinge pin 15 comes into contact with a surface on the outer side of the center portion 18b to restrict movement (detachment toward the outer side) of the linking lever 18 toward the axial direction of the hinge pin 15.

The linking lever 18 can be held at a locking position (FIGS. 3, 4 and 6) by the biasing force of the lock biasing spring (not shown) built in the reclining lock mechanism 14, and rotate from the locking position to an unlocking position (FIGS. 8, 10, 12 and 13) against the biasing force of the lock biasing spring. The rotation of the linking lever 18 from the locking position to the unlocking position refers to rotation in an unlocking direction.

A distal end of the transmission arm 18c of the linking lever 18 is bent toward the inner side (see FIG. 2). A bent portion of the transmission arm 18c is located between the rotation transmission portion 20e and the return regulating portion 20f of the open plate 20 (see FIGS. 3, 4, 6, 8, 10, 12 and 13). The interval between the rotation transmission portion 20e and the return regulating portion 20f in the rotational direction whose center is the rotation center 5x is configured wider than the width of the transmission arm 18c. More specifically, the transmission arm 18c can be located with clearances concurrently formed in the rotational direction with respect to both of the rotation transmission portion 20e and the return regulating portion 20f (see FIGS. 3 and 4). Furthermore, in a state where the transmission arm 18c is in contact with one of the rotation transmission portion 20e and the return regulating portion 20f, the clearance in the rotational direction is always formed between the other one of the rotation transmission portion 20e and the return regulating portion 20f, and the transmission arm 18c (see FIGS. 6, 8, 10, 12 and 13).

A biasing spring 19 is arranged between the lower bracket 11 and the open plate 20. The biasing spring 19 is a torsion spring that includes a coil portion housed in a recessed portion of the support base 17, and engages one of a pair of arms extending from the coil portion toward a radial direction, with the lower bracket 11 and engages the other one of arms with the open plate 20. The biasing spring 19 biases the open plate 20 to rotate in the clockwise direction in FIG. 3 and in a counterclockwise direction in FIGS. 4, 6, 8, 10, 12 and 13. The open plate 20 can be held at a locking position (FIGS. 3 and 4) by the biasing force of the biasing spring 19, and rotate from the locking position to an unlocking position (FIGS. 8 and 10) against the biasing force of the biasing spring 19. The rotation of the open plate 20 from the locking position to the unlocking position refers to rotation in the unlocking direction.

On the outer side of the lower bracket 11 and at a position below the open plate 20, an intermediate stop lever 21 is rotatably supported with a shaft member 22 (FIG. 22) interposed therebetween. The intermediate stop lever 21 is provided with a stopper pin 24 at a position eccentric from the shaft member 22. The stopper pin 24 protrudes toward the inner side of the lower bracket 11 through an arc hole 11b formed in the lower bracket 11 (see FIGS. 4, 6, 8, 10, 12 and 13).

A control protrusion 25 is formed near a lower end of the upper bracket 12. The control protrusion 25 is at a position eccentric from the rotation center 5x of the seat back 5. When the intermediate stop lever 21 swings (rotates) about the shaft member 22, the stopper pin 24 moves between a forward-tilt restriction position (FIGS. 10 and 12) at which the stopper pin 24 advances onto a movement trajectory of the control protrusion 25 of the upper bracket 12 (a rotation trajectory of the control protrusion 25 whose center is the rotation center 5x), and a restriction release position (FIGS. 4, 6, 8 and 13) at which the stopper pin 24 evacuates downward from the movement trajectory of the control protrusion 25.

A first bracket 40 is fixed near a lower end of the surface on the outer side of the lower bracket 11. The first bracket 40 includes a leg portion that protrudes toward the outer side and a flat plate portion that is located at a distal end of the leg portion. A shaft support hole (not shown) is formed in the flat plate portion. A cable support groove 40a is formed in a side portion of the first bracket 40 (see FIG. 2).

A support guide plate 41 is fixed to the outer side of the first bracket 40. As illustrated in FIG. 2, the support guide plate 41 includes a spring hook portion 41a that protrudes toward the outer side, a shaft support hole 41b and an arc hole 41c. The arc hole 41c is an elongate hole that extends in the circumferential direction whose center is the shaft support hole 41b.

A handle fastening member 42 is supported on the outer side of the support guide plate 41. As illustrated in FIG. 2, a shaft hole 42a, a guide pin attachment hole 42b and a rod attachment hole 42c are formed in the handle fastening member 42.

A shaft member 43 is inserted in a shaft support hole (not shown) of the first bracket 40, the shaft support hole 41b of the support guide plate 41 and a shaft hole 42a of the handle fastening member 42. The shaft member 43 is supported fixedly with respect to the first bracket 40 and the support guide plate 41, and an inner circumferential surface of the shaft hole 42a of the handle fastening member 42 is rotatably in contact with an outer circumferential surface of the shaft member 43. Furthermore, a guide pin 44 is inserted in the arc hole 41c of the support guide plate 41 and a guide pin attachment hole 42b of the handle fastening member 42.

The first bracket 40 and the support guide plate 41 are fastened and fixed to each other by a rivet 45 (FIG. 2). Furthermore, the first bracket 40 is fastened and fixed to the lower bracket 11 by rivets 46 (FIG. 2).

That is, the first bracket 40 and the support guide plate 41 having a mutually fixed relationship are supported fixedly with respect to the lower bracket 11. The handle fastening member 42 is supported rotatably about the shaft member 43. Rotation of the handle fastening member 42 causes the guide pin 44 to move in the arc hole 41c, and forward and reverse rotations of the handle fastening member 42 are restricted by contact of the guide pin 44 with the end portions of the arc hole 41c.

The lock release handle 6 is fastened and fixed to the handle fastening member 42 by using rivets 47 (FIG. 2). Hence, a coupled body of the lock release handle 6 and the handle fastening member 42 is supported swingably (rotatably) via the shaft member 43 with respect to the first bracket 40 and the support guide plate 41 supported fixedly by the lower bracket 11. A center axis of the shaft member 43 is coincident with the rotation center 6x of the lock release handle 6 illustrated in FIG. 1.

A coil portion of a torsion spring 48 is supported on an outer side of the shaft member 43. The torsion spring 48 includes a pair of spring end portions that protrude from the coil portion. The one spring end portion engages with a spring hook portion 6a of the lock release handle 6. The other spring end portion engages with the spring hook portion 41a of the support guide plate 41. The torsion spring 48 applies a force for biasing and rotating the lock release handle 6. This biasing force acts in a direction (the clockwise direction in FIG. 3 and the counter clockwise direction in FIGS. 4, 6, 8, 10, 12 and 13) in which the guide pin 44 comes into contact with one end portion 41d of the arc hole 41c. A position at which the guide pin 44 comes into contact with the end portion 41d of the arc hole 41c refers to an initial position of the lock release handle 6.

A second bracket 49 is fixed to the surface on the outer side of the lower bracket 11, and at a position below positions at which the open plate 20 and the intermediate stop lever 21 are supported and different from the first bracket 40. The second bracket 49 is fastened and fixed to the lower bracket 11 by rivets 50 (FIGS. 2 and 3). A cable support groove 49a is formed in the second bracket 49 (see FIG. 3).

Manually operating the lock release handle 6 causes the operating force to be transmitted to the open plate 20 via a connection rod 55. A bush 55a formed at one end portion of the connection rod 55 connects with the rod attachment hole 42c formed in the handle fastening member 42 having a fixed relationship with the lock release handle 6. A bush 55b formed at the other end portion of the connection rod 55 connects with the arc hole 20c of the open plate 20. The bush 55b is movable in the arc hole 20c. When the lock release handle 6 is at the initial position, the bush 55b is located near an end portion below the arc hole 20c. Furthermore, when the lock release handle 6 is rotated from the initial position toward a raising direction (the counterclockwise direction in FIG. 3 and the clockwise direction in FIG. 4) against the biasing force of the torsion spring 48, the bush 55b comes into contract with the end portion below the arc hole 20c to transmit a force, and rotate the open plate 20 from the locking position to the unlocking position in the unlocking direction (the counterclockwise direction in FIG. 3 and the clockwise direction in FIG. 4).

Manually operating the walk-in operation lever 7 causes the operating force to be transmitted to the open plate 20 via an operating cable 56. An end portion 56a of the operating cable 56 is connected with the cable connection hole 20b of the open plate 20. The operating cable 56 is extended downward from the cable connection hole 20b, and is inserted into a tubular cable guide (not shown) to be capable of advancing and retreating therein. An end portion of the cable guide that guides the operating cable 56 is fitted in the cable support groove 49a (FIG. 3) formed in the second bracket 49, to be prevented from moving in the direction of extension of the operating cable 56. Although not illustrated, the operating cable 56 changes the extension direction thereof at a position below the second bracket 49 to extend upward and connects with the walk-in operation lever 7. Manually operating the walk-in operation lever 7 causes the open plate 20 to be given a force which pulls down the vicinity of the cable connection hole 20b via the operating cable 56, thus causing the open plate 20 to rotate from the locking position to the unlocking position in the unlocking direction (the counterclockwise direction in FIG. 3 and the clockwise direction in FIG. 4). When the open plate 20 is rotated to the unlocking direction by pulling the operating cable 56, a position of the bush 55*b* of the connection rod 55 in the arc hole 20*c* relatively changes. Therefore, no force in the rotational direction is transmitted to the connection rod 55 from the open plate 20, and the lock release handle 6 remains the initial position.

The vehicle seat 1 is provided with a linking cable 58 as an operating force transmission member that interlocks the outer side seat reclining apparatus 10 and the inner side seat reclining apparatus 70. In the outer side seat reclining apparatus 10, an outer side end portion 58*a* of the linking cable 58 connects with the cable connection hole 20*d* of the open plate 20. The linking cable 58 is extended downward from the cable connection hole 20*d* (outer side end portion 58*a*), and is inserted into a tubular cable guide 59 (part of which is illustrated in FIGS. 4 to 13) to be capable of advancing and retreating therein. An outer side end portion 59*a* (FIG. 3) of the cable guide 59 is fitted in the cable support groove 40*a* (FIG. 2) formed in the first bracket 40, to be prevented from moving in the direction of extension of the linking cable 58.

As illustrated in FIGS. 5, 7, 9 and 11, the inner reclining apparatus 70 includes a lower bracket 71 that corresponds to the outer side lower bracket 11 and an upper bracket 72 that corresponds to the outer side upper bracket 12. The lower bracket 71 is supported fixedly on the side of the seat cushion 4 (near a rear end of the seat cushion frame 4*a* illustrated in FIG. 1). The upper bracket 72 is supported fixedly on the side of the seat back 5. The reclining apparatus 70 includes a forward-tilt biasing spring (not shown) which corresponds to the outer side forward-tilt biasing spring 16, and the upper bracket 72 is biased in the forward-tilt direction with respect to the lower bracket 71.

The reclining lock mechanism 74 is arranged between the lower bracket 71 and the upper bracket 72. The reclining lock mechanism 74 adopts substantially the same structure as the outer side reclining lock mechanism 14. In a state where an operation is not performed via the linking cable 58, the reclining lock mechanism 74 maintains a locked state where a biasing force of a lock biasing spring (not shown) built in the reclining lock mechanism 74 prevents the upper bracket 72 from tilting with respect to the lower bracket 71.

The reclining apparatus 70 includes an open plate 73 that can rotate pivotally about a hinge pin 75. The open plate 73 is provided with a base portion 73*a* at which a non-circular cross-sectional hole in which a non-circular cross-sectional portion of the hinge pin 75 fits is formed. Accordingly, the open plate 73 integrally rotates with the hinge pin 75. The open plate 73 is further provided with an arm 73*b* that is extended from the base portion 73*a* toward the radial direction.

Figure 5:
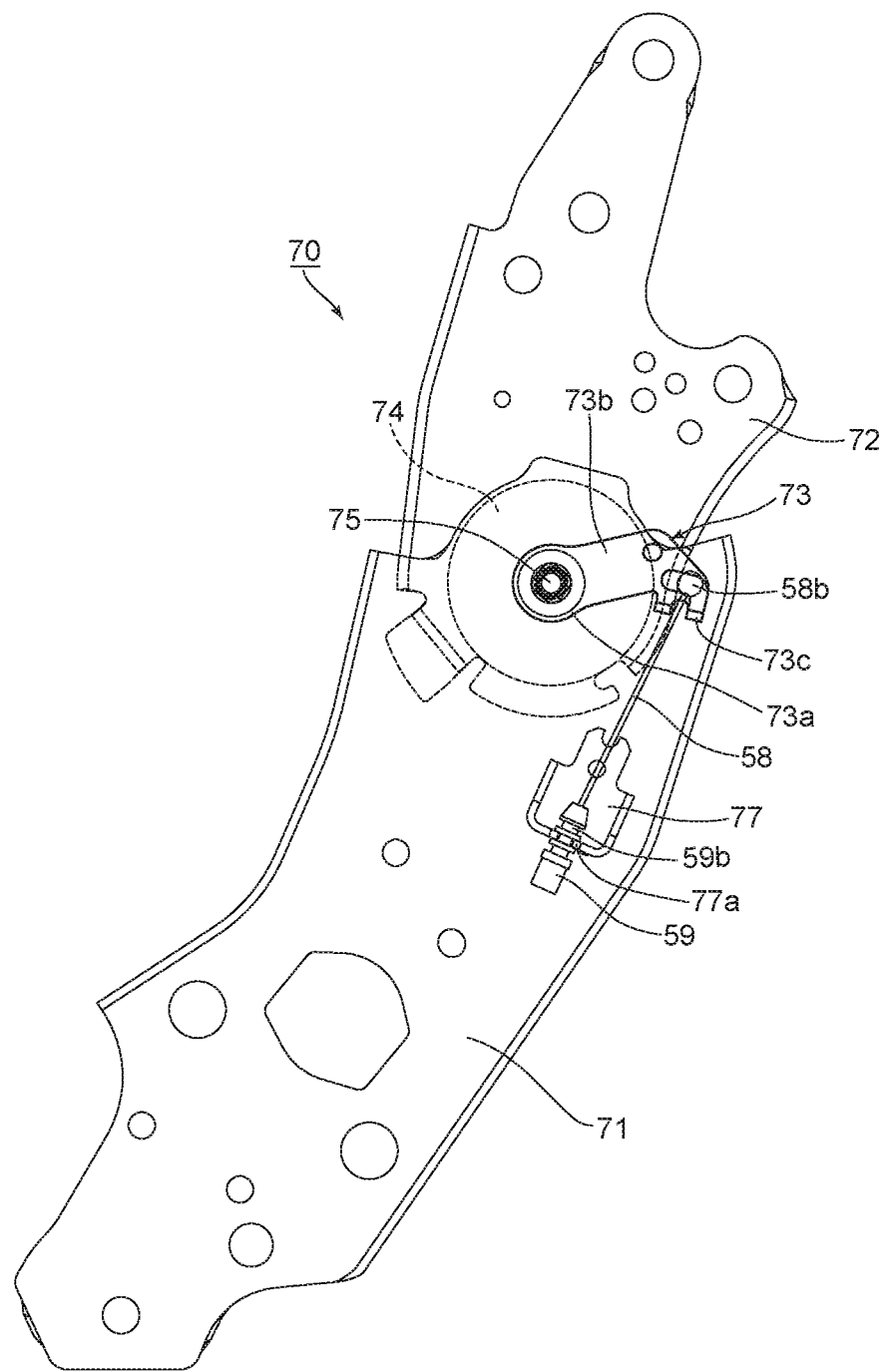
FIG. 5 is a side view illustrating from the inner side an inner side seat reclining apparatus in the state where the seat back is in the reclining range.
Figure 7:
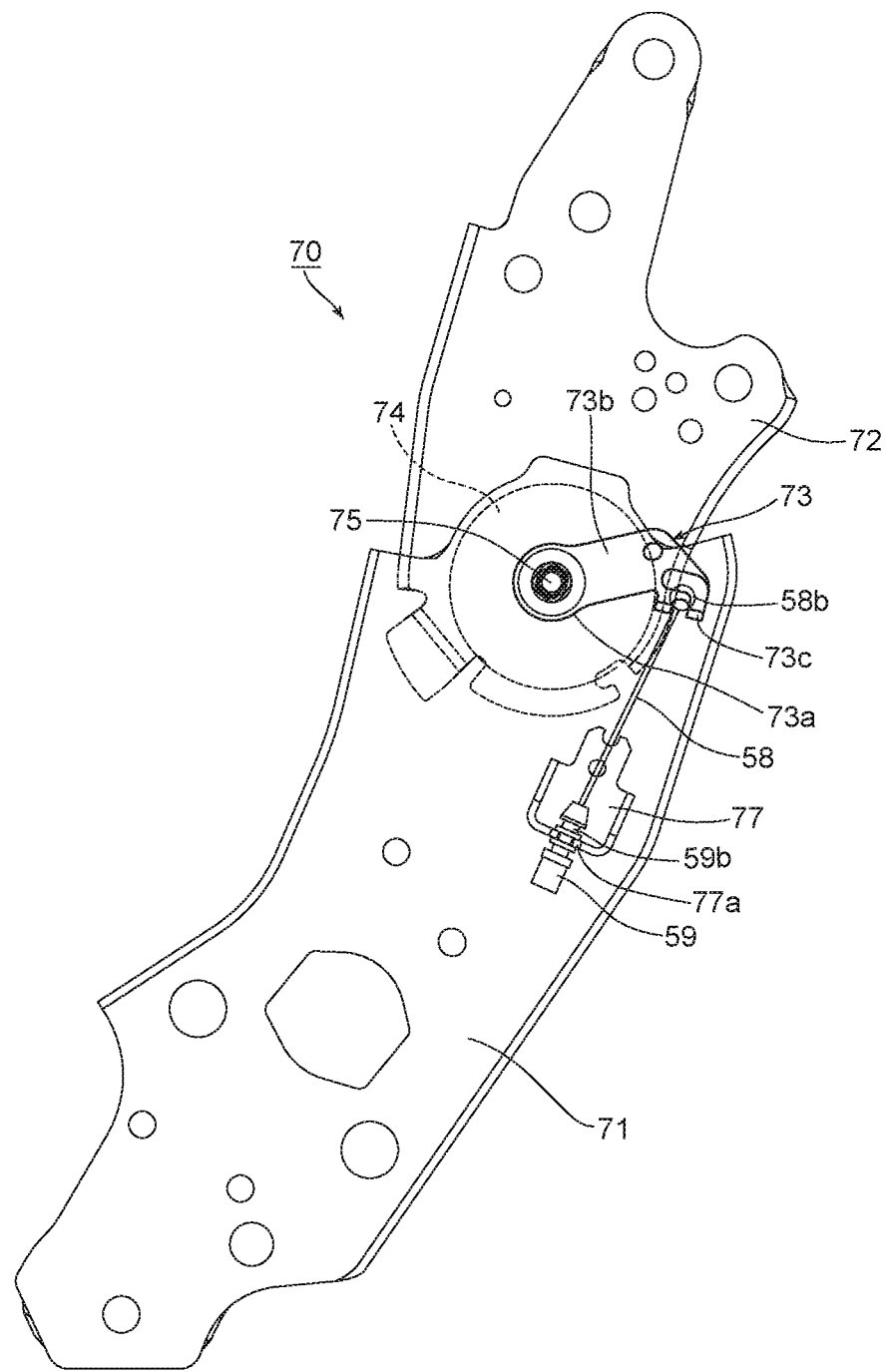
FIG. 7 is a side view illustrating from the inner side the inner side seat reclining apparatus in the state of FIG. 6.
Figure 9:
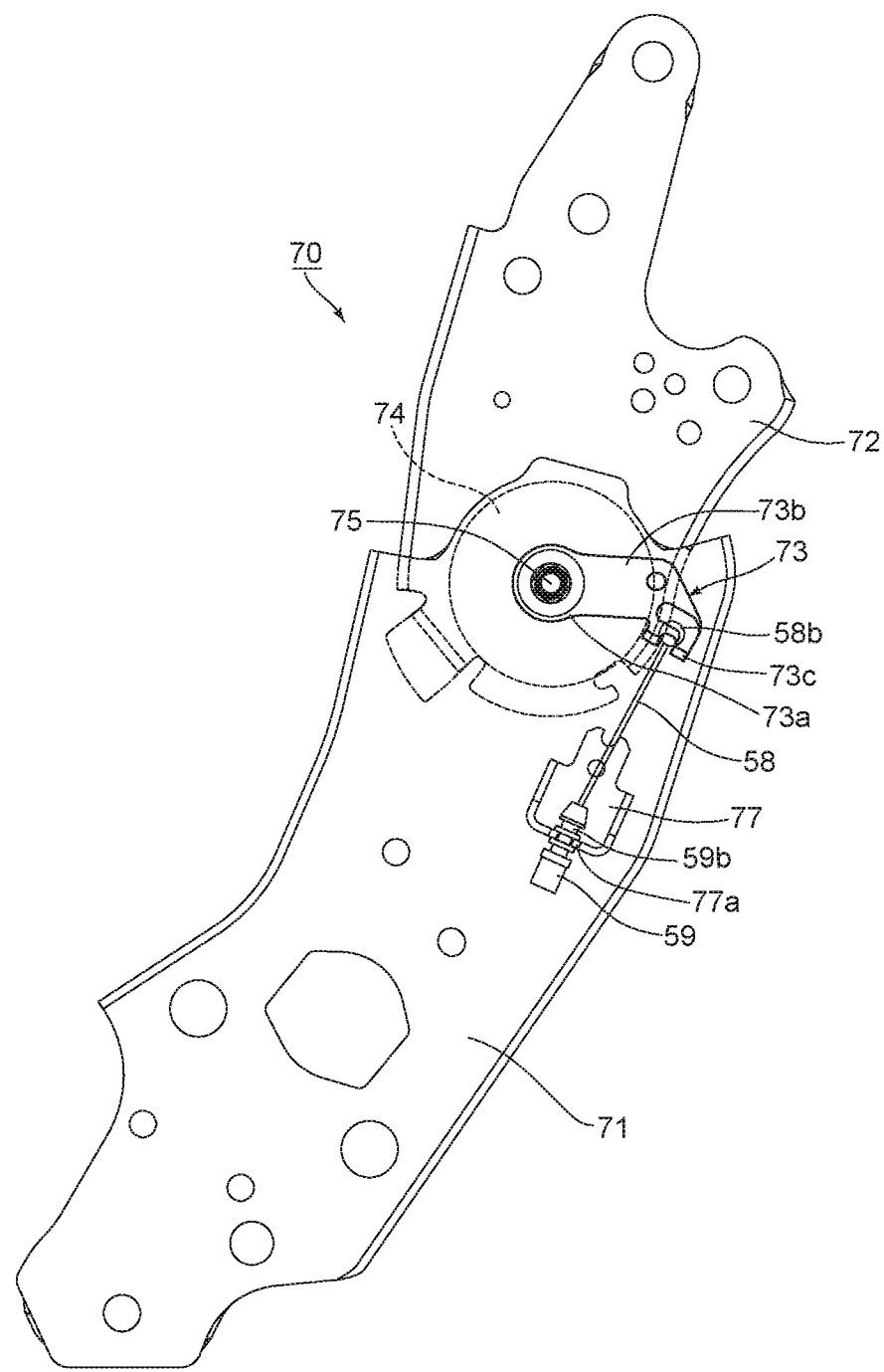
FIG. 9 is a side view illustrating from the inner side the inner side seat reclining apparatus in the state of FIG. 8.
Figure 11:
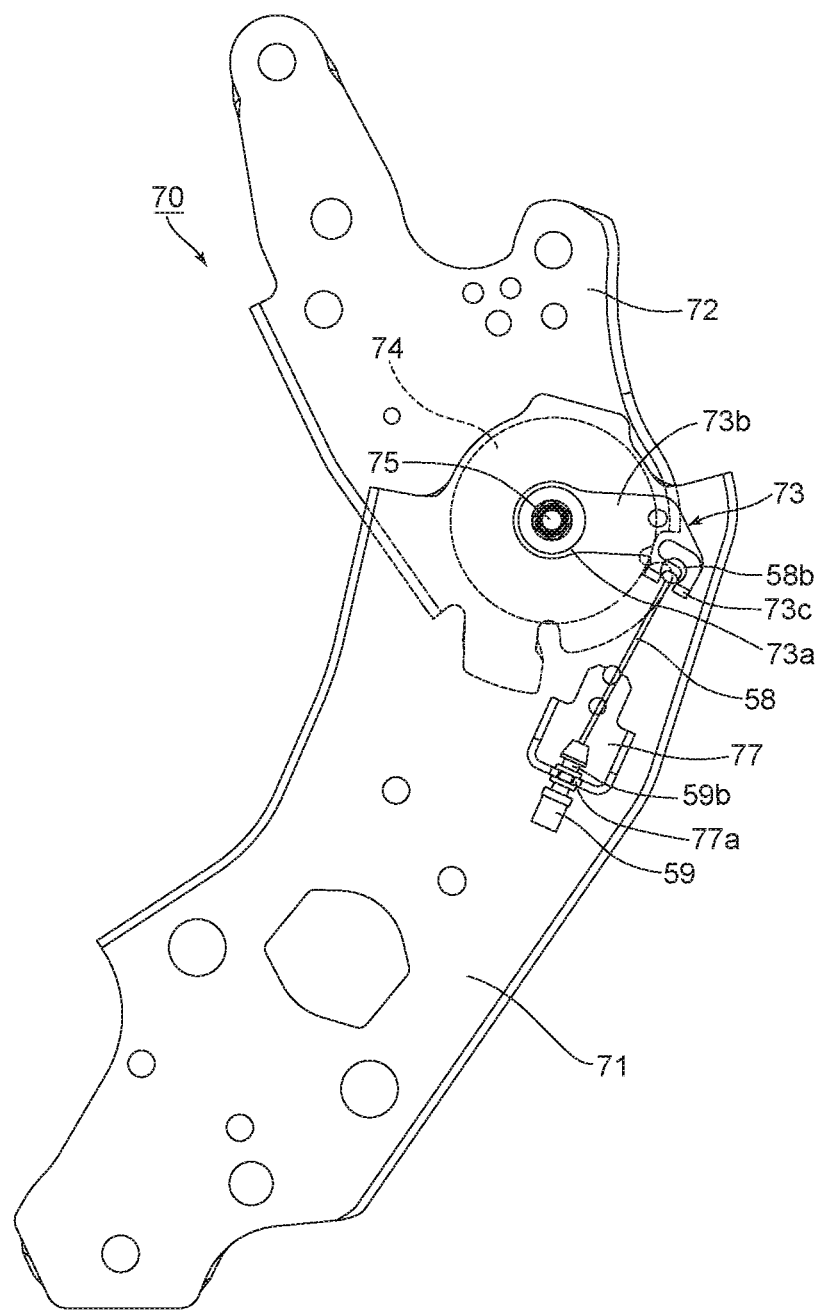
FIG. 11 is a side view illustrating from the inner side the inner side seat reclining apparatus in the state in FIG. 10.

The open plate 73 rotates together with the hinge pin 75 to change the reclining lock mechanism 74 between the locked state and an unlocked state. A position of the open plate 73 illustrated in FIGS. 5 and 7 is a locking position at which the reclining lock mechanism 74 is in the locked state. The position of the open plate 73 illustrated in FIGS. 9 and 11 is an unlocking position at which the reclining lock mechanism 74 is placed in the unlocked state. Rotation of the open plate 73 from the locking position to the unlocking position refers to rotation in the unlocking direction. The open plate 73 is biased toward the locking position by a biasing force of a lock biasing spring (not shown) built in the reclining lock mechanism 74.

An inner side end portion 58*b* of the linking cable 58 connects with a cable connection portion 73*c* arranged at a distal end of the arm 73*b* of the open plate 73. More specifically, the cable connection portion 73*c* includes a slit portion in which the linking cable 58 is inserted, and a pair of vertical wall portions that are located on both sides of the slit portion. The inner side end portion 58*b* of the linking cable 58 has the width that does not pass the slit portion of the cable connection portion 73*c*, and is located above the vertical wall portions of the cable connection portion 73*c* (see FIGS. 5, 7, 9 and 11). The linking cable 58 extends downward from the cable connection portion 73*c*, and is guided from the inner side end portion 59*b* into the cable guide 59. An inner side end portion 59*b* of the cable guide 59 is fitted in a cable support groove 77*a* formed in a bracket 77 fixed to the lower bracket 71, to be prevented from moving in the extension direction of the linking cable 58.

When the open plate 20 rotates from the locking position to the unlocking position in the outer side reclining apparatus 10, the force transmits via the linking cable 58, and the open plate 73 rotates from the locking position to the unlocking position in the inner side reclining apparatus 70. Thus, the reclining lock mechanism 74 changes from the locked state to the unlocked state.

In a state where the linking cable 58 is not pulled by the open plate 20 of the outer side reclining apparatus 10, as illustrated in FIG. 5, the inner side end portion 58*b* is connected with the cable connection portion 73*c* with a margin in a cable extension direction. That is, in a state where the open plate 73 is at the locking position, there is a pulling margin in which the inner side end portion 58*b* is in contact with the cable connection portion 73*c* and is yet to pull the open plate 73 in the unlocking direction. When the outer side open plate 20 pulls the linking cable 58 (FIG. 6), the inner side end portion 58*b* is moved for this pulling margin to come into contact with the cable connection portion 73*c* (FIG. 7), and transmit a force for rotating the open plate 73 in the unlocking direction (the clockwise direction in FIGS. 5, 7, 9 and 11). By configuring the linking cable 58 to the length that has such a margin, it is possible to absorb the variation in shape of each part or the error of assembly accuracy. Particularly, the outer side reclining apparatus 10 and the inner side reclining apparatus 70 are located significantly apart on the both sides of the vehicle seat 1, and are difficult to be strictly precisely managed. Therefore, it is effective to use a configuration where the linking cable 58 can absorb the error.

Manually operating the fold-down operation lever 8 causes the operating force (a force in a direction for moving the stopper pin 24 from the forward-tilt restriction position to the restriction release position) to be transmitted to the intermediate stop lever 21 via an operating cable 60 (FIG. 3) in the outer side seat reclining apparatus 10 (FIG. 3).

Figure 4:
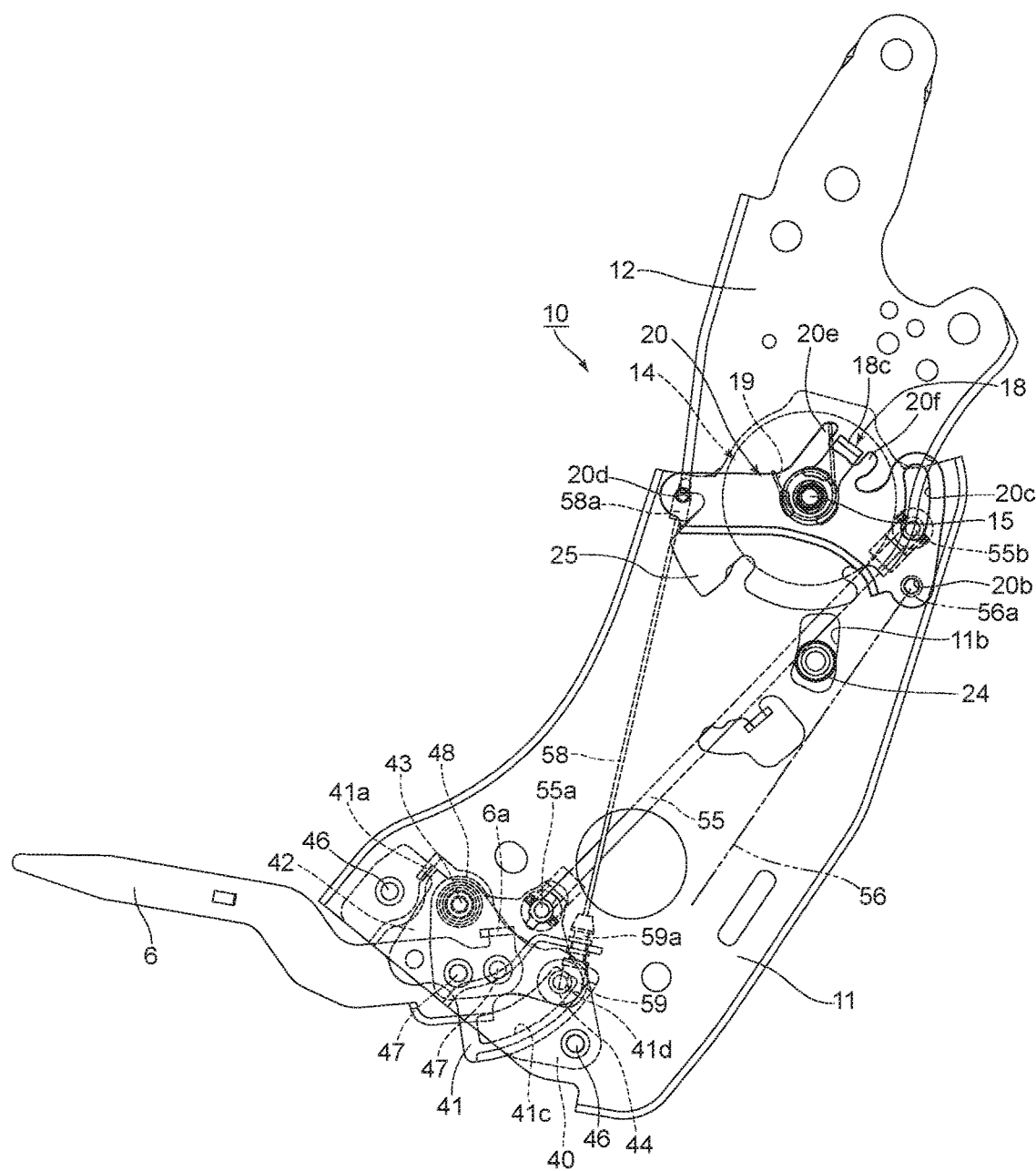
FIG. 4 is a side view illustrating from an inner side the outer side seat reclining apparatus in the state where the seat back is in the reclining range.

Operations of the seat reclining apparatuses 10 and 70 configured as described will be described hereinafter. FIGS. 3 to 5 illustrate the seat reclining apparatuses 10 and 70 in a seated state where the seat back 5 is in the reclining range R (an angle close to the initial locking position 5A shown in FIG. 1). In this state, the lock release handle 6 is held at the initial position by the biasing force of the torsion spring 48, and the outer side reclining lock mechanism 14 and the inner side reclining lock mechanism 74 are in the locked state where the angle of the upper bracket 12 (seat back 5) is fixed (reclining is prevented). According to the locked states of the reclining lock mechanisms 14 and 74, the open plates 20 and 73 and the linking lever 18 are at the locking positions. Furthermore, the stopper pin 24 is held at the restriction release position.

As illustrated in FIGS. 3 and 4, in the outer side seat reclining apparatus 10 in the seated state, the open plate 20 is held at the locking position by the biasing force of the biasing spring 19, and both of the rotation transmission portion 20e and the return regulating portion 20f of the open plate 20 at the locking positions are apart from the transmission arm 18c of the linking lever 18. In other words, the transmission arm 18c is located at an intermediate position of the rotation transmission portion 20e and the return regulating portion 20f, and there are gaps in the rotational direction between the transmission arm 18c and the rotation transmission portion 20e and between the transmission arm 18c and the return regulating portion 20f, respectively. The linking lever 18 is held at the locking position by the biasing force of the lock biasing spring built in the reclining lock mechanism 14.

As described above, the linking cable 58 is configured to the length that has a predetermined amount of the pulling margin in the seated state. Hence, as illustrated in FIG. 5, the inner side seat reclining apparatus 70 in the seated state includes a clearance between the inner side end portion 58b of the linking cable 58 and the cable connection portion 73c of the open plate 73.

When the lock release handle 6 is operated to rotate from the initial position toward the raising direction (the counterclockwise direction in FIG. 3 and the clockwise direction in FIG. 4) against the biasing force of the torsion spring 48 in the seated state, the force transmits from the handle fastening member 42 (rod attachment hole 42c) to the bush 55a in outer side seat reclining apparatus 10, and the connection rod 55 is pulled downward. Then, the force is applied from the bush 55b of the connection rod 55 to a lower end of the arc hole 20c of the open plate 20, and the open plate 20 starts rotating from the locking position toward the unlocking direction (the counterclockwise direction in FIG. 3 and the clockwise direction in FIG. 4) against the biasing force of the biasing spring 19.

At an initial stage of rotation of the open plate 20 from the locking position toward the unlocking direction, the rotation transmission portion 20e and the return regulating portion 20f are apart from the transmission arm 18c. Therefore, the rotation force does not transmit from the open plate 20 to the linking lever 18. The open plate 20 alone rotates about the rotation center 5x while making an inner circumferential surface of the circular hole 20a slide on an outer circumferential surface of the circular cross-sectional portion 15c of the hinge pin 15, and the linking lever 18 and the hinge pin 15 do not rotate.

Figure 6:
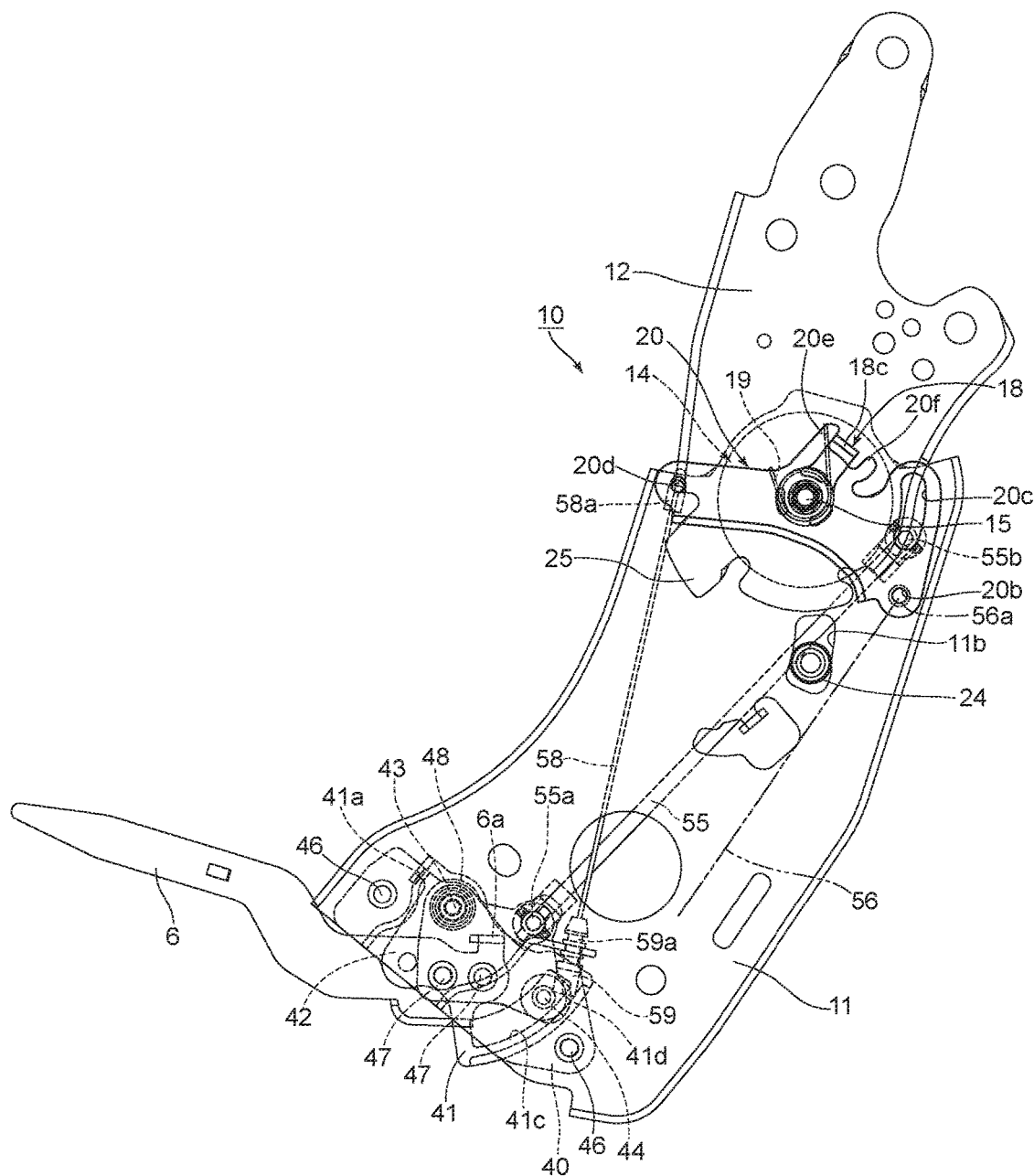
FIG. 6 is a side view illustrating from the inner side the outer side seat reclining apparatus in a state where a lock release handle is operated to start an unlocking operation.

FIG. 6 illustrates a state where the open plate 20 alone rotates from the locking position toward the unlocking position, and the rotation transmission portion 20e reaches a position to contact the transmission arm 18c of the linking lever 18. The rotation of the open plate 20 from the locking position illustrated in FIG. 4 to the position in FIG. 6 pulls the outer side end portion 58a of the linking cable 58 by a small amount. This pulling amount corresponds to a size of the above pulling margin of the linking cable 58. As illustrated in FIG. 7, the inner side end portion 58b of the linking cable 58 in the inner side seat reclining apparatus 70 comes into contact with the vertical wall portions of the cable connection portion 73c.

In the states in FIGS. 6 and 7, in both of the outer side seat reclining apparatus 10 and the inner side seat reclining apparatus 70, the reclining lock mechanisms 14 and 74 maintain the locked states. When the lock release handle 6 is operated toward the raising direction against the biasing force of the torsion spring 48 in this state, the open plate 20 in the outer side seat reclining apparatus 10 further rotates toward the unlocking direction (the clockwise direction in FIG. 6) via the connection rod 55, and enters a state illustrated in FIG. 8. As a result of the rotation of this open plate 20, the rotation transmission portion 20e presses the transmission arm 18c, and the rotation force transmits from the open plate 20 to the linking lever 18. The linking lever 18 rotates integrally with the hinge pin 15 toward the unlocking direction, and causes the reclining lock mechanism 14 to perform the unlocking operation.

In this state, the rotation transmission portion 20e places into contact with the transmission arm 18c a surface (surface that faces the return regulating portion 20f) substantially parallel to the virtual line L1 (FIG. 14) extending from the rotation center 5x toward the radial direction. Consequently, the rotation transmission portion 20e and the transmission arm 18c come into contact according to such a positional relationship that the rotation transmission portion 20e and the transmission arm 18c confront each other in the rotational direction of the open plate 20. Consequently, it is possible to efficiently transmit the rotation force from the open plate 20 to the linking lever 18 with little loss of the force.

Furthermore, the rotation of the open plate 20 in the unlocking direction pulls the linking cable 58. Then, the inner side end portion 58b of the linking cable 58 in the inner side seat reclining apparatus 70 pulls the cable connection portion 73c downward, and the open plate 73 rotates toward the unlocking direction (the clockwise direction in FIG. 7) and enters the state illustrated in FIG. 9. In this state, the open plate 73 and the hinge pin 75 integrally rotate to cause the reclining lock mechanism 74 to perform the unlocking operation.

Figure 8:
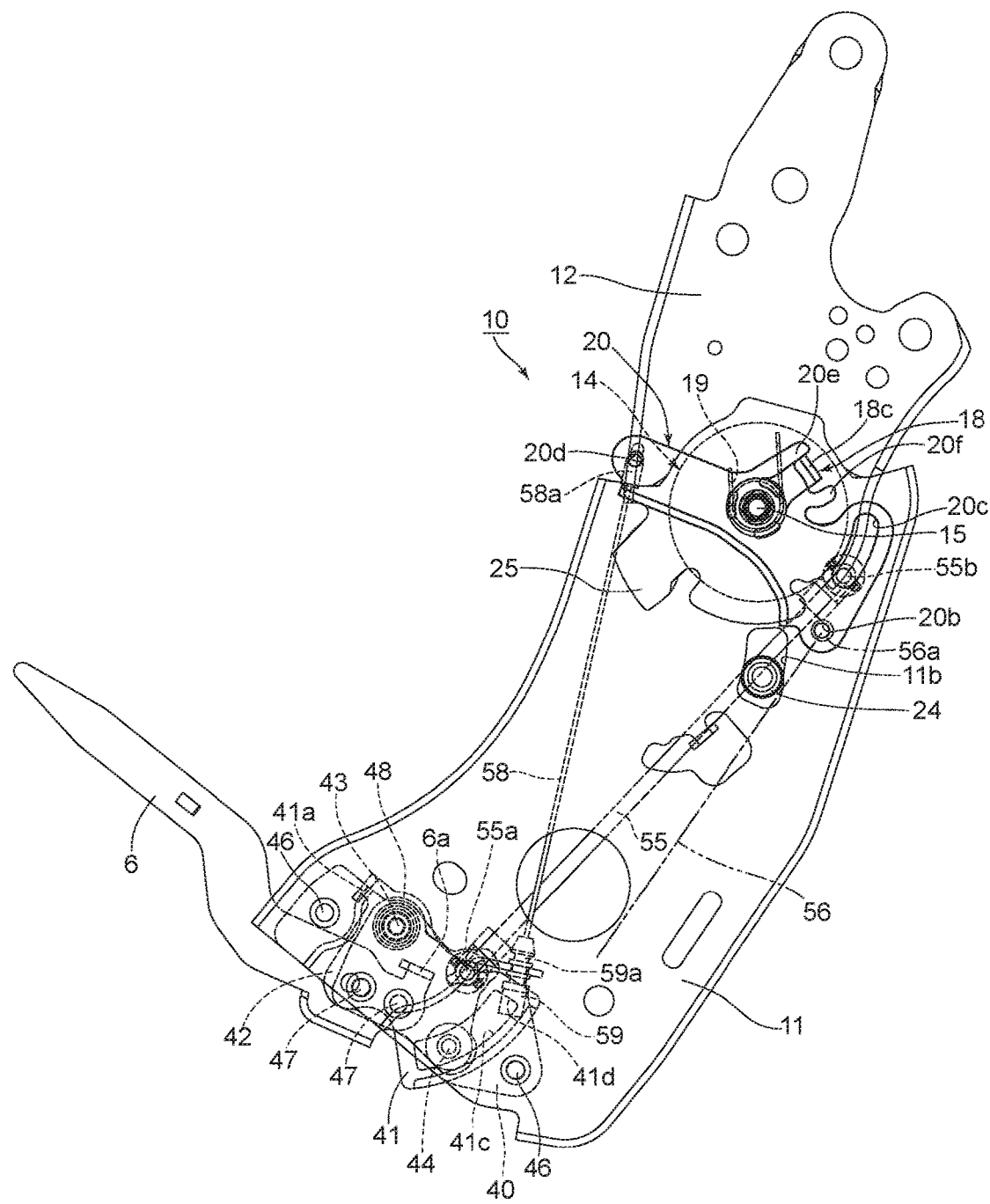
FIG. 8 is a side view illustrating from the inner side the outer side seat reclining apparatus in an unlocked state.

That is, in both of the outer side seat reclining apparatus 10 and the inner side seat reclining apparatus 70, the reclining lock mechanisms 14 and 74 are unlocked. FIGS. 8 and 9 illustrate states where the respective reclining lock mechanisms 14 and 74 have been unlocked.

A timing (FIG. 6) to start the unlocking operation in the outer side seat reclining apparatus 10 and a timing (FIG. 7) to start the unlocking operation in the inner side seat reclining apparatus 70 are determined based on a relationship between the interval between the rotation transmission portion 20e of the open plate 20 and the transmission arm 18c of the linking lever 18 in the initial state (FIGS. 3, 4 and 5) and the pulling margin of the linking cable 58. In the present embodiment, these conditions are configured such that both of the seat reclining apparatuses 10 and 70 start substantially concurrently the unlocking operations.

In the unlocked states illustrated in FIGS. 8 and 9, the angle of the seat back 5 in the reclining range R (FIG. 1) can be changed. When the angle of the seat back 5 is determined in the reclining range R and the operation of raising the lock release handle 6 is released, the open plate 20 is returned from the unlocking position to the locking position by the biasing force of the biasing spring 19, and the linking lever 18 is returned from the unlocking position to the locking position by the biasing force of the lock biasing spring built in the reclining lock mechanism 14. Consequently, the outer side reclining lock mechanism 14 and the inner side reclining lock mechanism 74 return to the locked states, so that it is possible to maintain the changed angle of the seat back 5.

When the open plate 20 and the open plate 73 rotate from the locking position to the unlocking position, and the reclining lock mechanisms 14 and 74 enter the unlocked states, the vehicle seat 1 transitions to a so-called walk-in state (FIGS. 10 to 12) unless the seat back 5 is held by an external force such as a manual force. When the vehicle seat 1 transitions to the walk-in state, the seat back 5 is stopped near an intermediate position (i.e., the intermediate stop position 5B) of the unlocking range U (FIG. 1) that is ahead of the reclining range R by the biasing force of the forward-tilt biasing spring 16, while the slide lock state by the slide-lock mechanism 3 is released.

The walk-in state can be achieved by rotating the open plate 20 to the unlocking position by operating one of the lock release handle 6 and the walk-in operation lever 7. When the lock release handle 6 is operated, the force transmits to the open plate 20 via the connection rod 55 as described above. When the walk-in operation lever 7 is operated, the force transmits to the open plate 20 via the operating cable 56. In both cases, as the result of the rotation of the open plate 20 to the unlocking position, the linking lever 18 and the open plate 73 rotate from the locking positions to the unlocking positions, and the reclining lock mechanism 14 and the reclining lock mechanism 74 enter the unlocked states. Furthermore, the upper bracket 12 tilts forward with respect to the lower bracket 11 (see FIG. 10) by the biasing force of the forward-tilt biasing spring 16. On the inner side, too, the upper bracket 72 tilts forward with respect to the lower bracket 71 (see FIG. 11).

Figure 10:
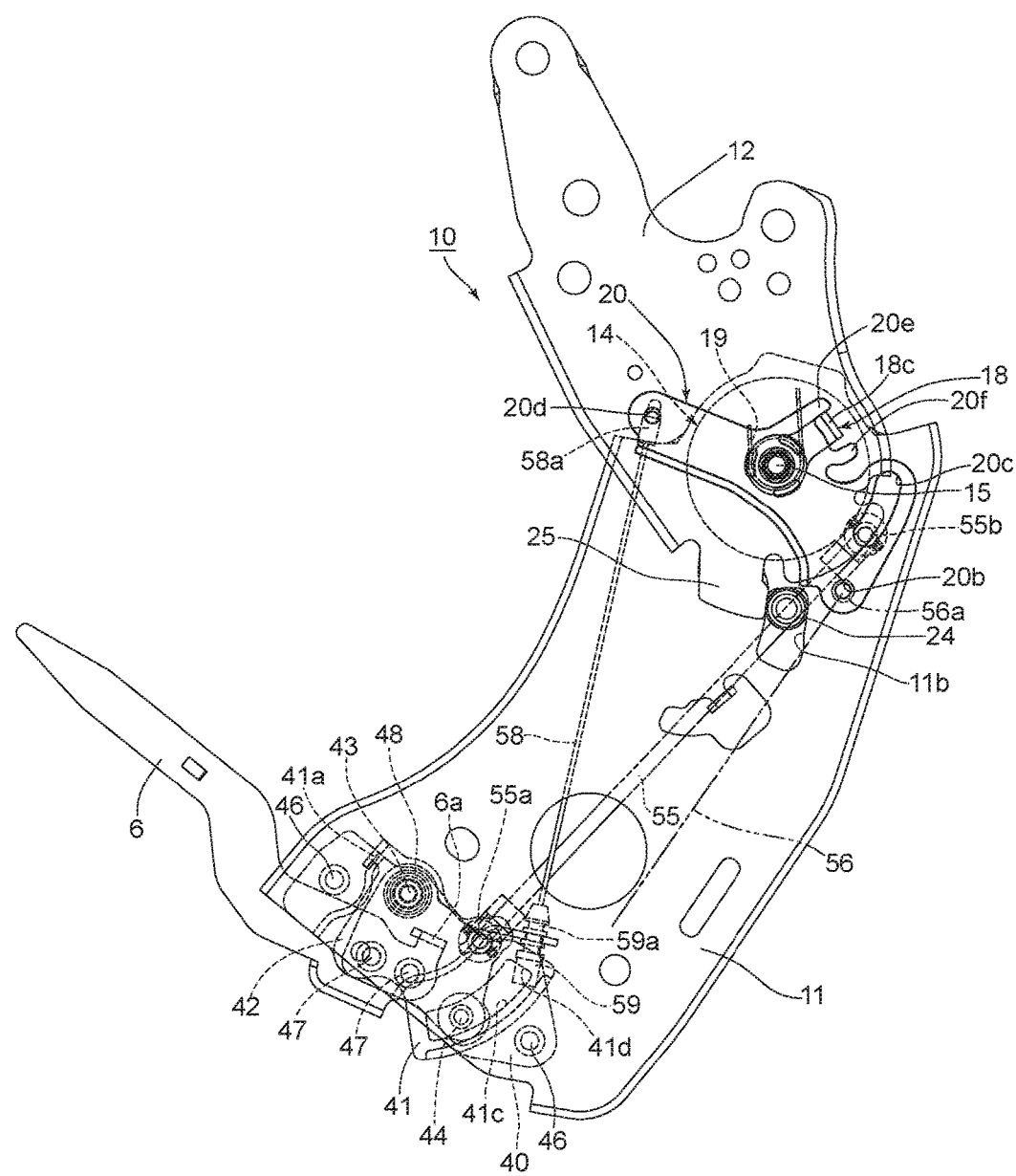
FIG. 10 is a side view illustrating from the inner side the outer side seat reclining apparatus in a state where the seat back is at an intermediate stop position.

While the upper bracket 12 tilts forward, the intermediate stop lever 21 rotates and the stopper pin 24 moves to the forward-tilting restriction position (FIG. 10). Furthermore, when the control protrusion 25 comes into with the stopper pin 24, the upper bracket 12 is prevented from tilting forward and stops at the intermediate position in the unlocking range U. The angular position of the seat back 5 in this state is the intermediate stop position 5B illustrated in FIG. 1. Furthermore, the force produced when the upper bracket 12 tilts to the intermediate stop position 5B transmits, so that the slide lock state of the slide-lock mechanism 3 is released. That is, this is the walk-in state where it is easy to get on and off from a rear space (rear seats) of the vehicle seat 1.

Figure 12:
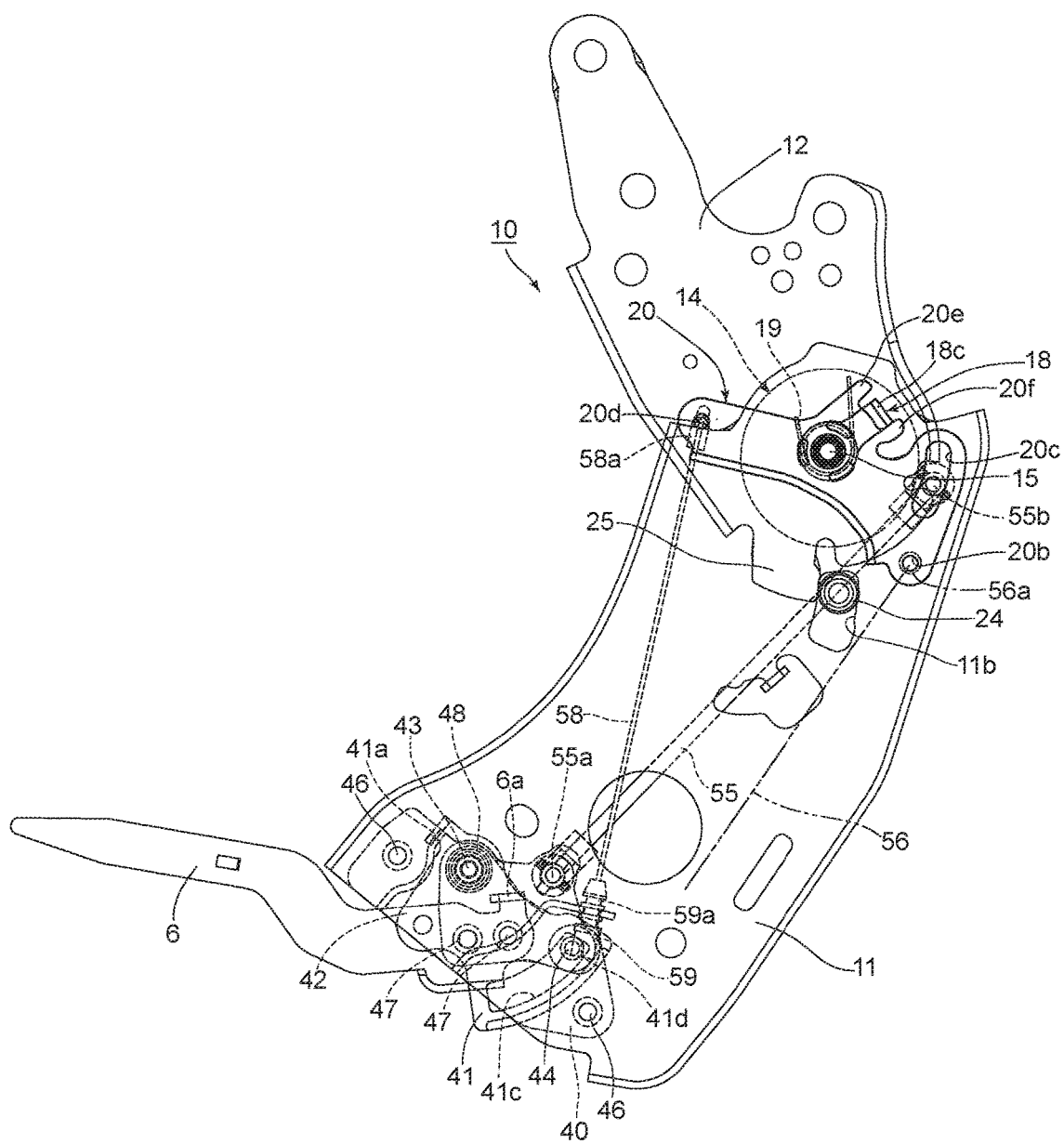
FIG. 12 is a side view illustrating from the inner side the outer side seat reclining apparatus in a state where the seat back is at the intermediate stop position and the operation of the lock release handle is released.

Even when the operations of the lock release handle 6 and the walk-in operation lever 7 are released, the walk-in state is maintained. The outer side reclining lock mechanism 14 is provided with an enmeshing regulating portion (not shown) that prevents enmeshing of the outer teeth of the lock members and the inner teeth of the ratchet plate 14b when the seat back 5 is in the unlocking range U. Hence, as illustrated in FIG. 12, the linking lever 18 continues being held at the unlocking position, and is prevented from rotating to the locking position. The inner side reclining lock mechanism 74 also includes the same enmeshing regulating portion. As illustrated in FIG. 11, the open plate 73 continues being held at the unlocking position, and is prevented from rotating to the locking position.

When the operation of raising the lock release handle 6 is released in the walk-in state as illustrated in FIG. 12, the biasing force of the torsion spring 48 returns the lock release handle 6 to the initial position. Furthermore, when the operation of the walk-in operation lever 7 is released, the operating cable 56 becomes slack. In response to the unlocking of these operations, the biasing force of the biasing spring 19 in the outer side seat reclining apparatus 10 operates to rotate the open plate 20 from the unlocking position (FIG. 10) to the locking position (FIG. 4). However, when the open plate 20 rotates by a predetermined amount (corresponding to the interval between the return regulating portion 20f and the transmission arm 18c in the state in FIG. 10), the return regulating portion 20f comes into contact with the transmission arm 18c of the linking lever 18 as illustrated in FIG. 12, and is prevented from rotating more. The position of the open plate 20 in this case refers to a return regulating position. The return regulating position of the open plate 20 is closer to the unlocking position (FIGS. 8 and 10) than to the locking position (FIG. 4). In this state, the inner side open plate 73 is held at the unlocking position (FIG. 11). Therefore, by restricting rotation of the outer side open plate 20 at the return regulating position (FIG. 12) close to the unlocking position (FIG. 10), it is possible to prevent the linking cable 58 from slackening compared to a case where the open plate 20 rotates to the locking position (FIG. 4).

To cancel the walk-in state and return the vehicle seat 1 to the seated state, the seat back 5 is manually raised from the intermediate stop position 5B. When the seat back 5 is raised to the initial locking position 5A, the respective outer side and inner side reclining lock mechanism 14 and 74 are released from restriction of enmeshing by the enmeshing regulating portions, and return to the locked states, so that the angle of the seat back 5 is fixed. When the reclining lock mechanism 14 returns to the locked state, the linking lever 18 rotates from the unlocking position to the locking position (FIGS. 3 and 4). Thus, the transmission arm 18c moves apart from the return regulating portion 20f to release restriction of rotation of the open plate 20 (the state shown in FIG. 12), so that the open plate 20 is rotated to the locking position (FIGS. 3 and 4) by the biasing force of the biasing spring 19. Furthermore, when the reclining lock mechanism 74 returns to the locked state, the open plate 73 rotates from the unlocking position to the locking position (FIG. 5). In this way, the seat reclining apparatuses 10 and 70 return to the seated states illustrated in FIGS. 3 to 5.

Figure 13:
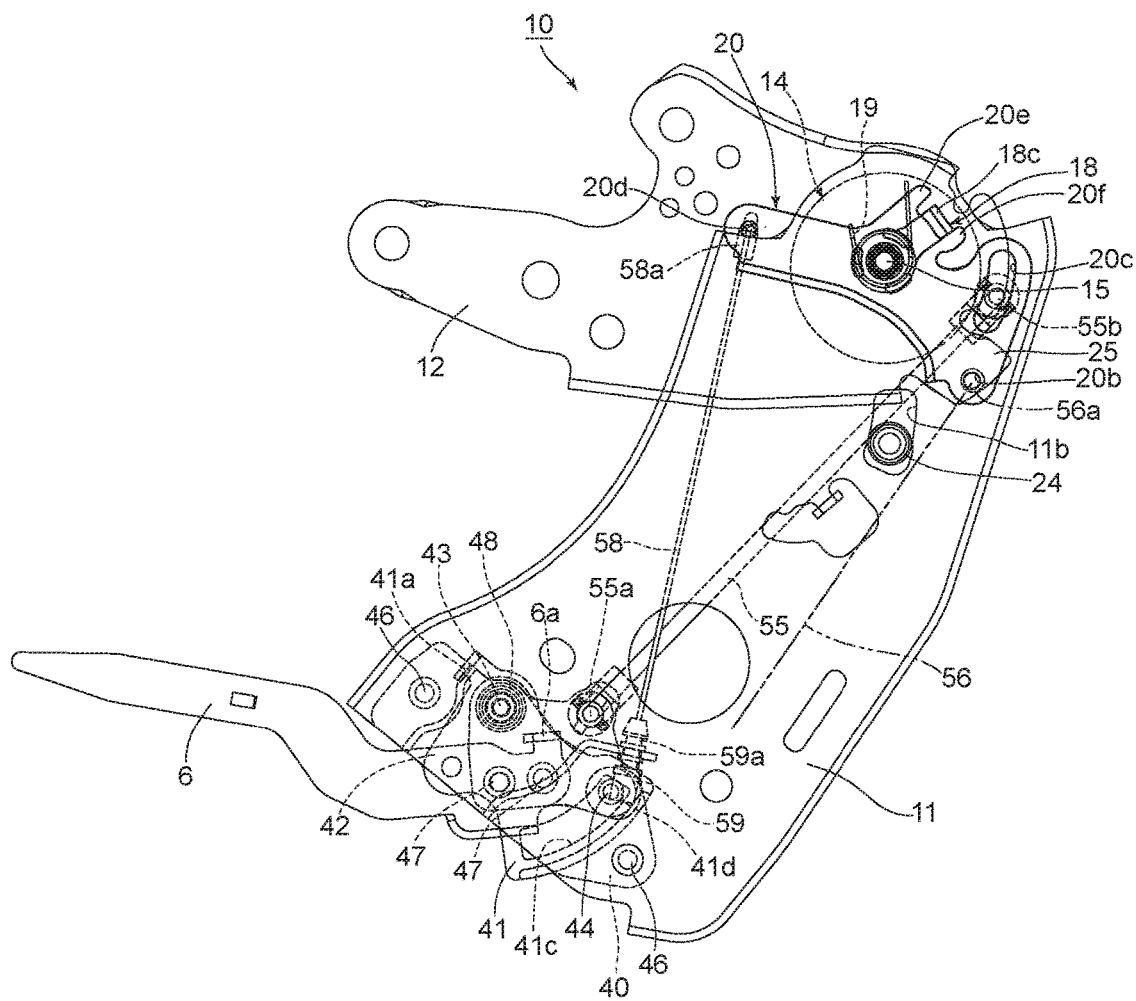
FIG. 13 is a side view illustrating from the inner side the outer side seat reclining apparatus in a state where the seat back is at a folded-down position.

When the fold-down operation lever 8 is operated in the walk-in state illustrated in FIG. 12, the operating cable 60 is pulled, the intermediate stop lever 2l rotates and the stopper pin 24 moves from the forward-tilt restriction position (FIG. 12) to the restriction release position (FIG. 13). Thus, it is possible to tilt the seat back 5 further forward from the intermediate stop position 5B, and the seat back 5 is tilted to the folded-down position 5C (FIG. 1) by the biasing force of the forward-tilt biasing spring 16. The outer side seat reclining apparatus 10 in this condition is in the folded-down state illustrated in FIG. 13. In folded-downstate, the linking lever 18 and the open plate 20 maintain the same positions as those in the walk-in state (FIG. 12).

Although not illustrated, when the seat back 5 is at the folded-down position 5C in FIG. 1, the upper bracket 72 in the inner side seat reclining apparatus 70 tilts forward to the same position as that of the upper bracket 12 in FIG. 13. The open plate 73 maintains the same position as that in the walk-in state (FIG. 11).

When the folded-down state transitions to the seated state (the seat back 5 is raised from the folded-down position 5C to the reclining range R), the outer side open plate 20, the linking lever 18 and the inner side open plate 73 operate in the same way as the time when the walk-in state transitions to the seated state as described above. That is, immediately before the state transitions to the seated state (initial locking position 5A), the linking lever 18 and the open plate 73 rotate from the unlocking positions to the locking positions. Furthermore, as the linking lever 18 rotates to the locking position, the open plate 20 rotates from the return regulating position (FIG. 12) to the locking position.

As described above, when the reclining lock mechanisms 14 and 74 are unlocked in the vehicle seat 1 according to the present embodiment, the operations of the operation members (the lock release handle 6 and the walk-in operation lever 7) are input to the open plate 20 arranged in the outer side seat reclining apparatus 10, and the operation force in the unlocking direction transmits from the open plate 20 to the inner side seat reclining apparatus 70 (reclining lock mechanism 74) via the linking cable 58.

The open plate 20 and the reclining lock mechanism 74 (open plate 73) are disposed separately on both sides (the outer side and the inner side) in the width direction of the vehicle seat 1, are very distant from each other, and are connected via the linking cable 58 that is a flexible cord like body. Consequently, a warp of the linking cable 58 and the pulling margin (the interval between the inner side end portion 58*b* and the cable connection portion 73*c* illustrated in FIG. 4) configured between the linking cable 58 and the open plate 73 produce a predetermined time lag from start of rotation of the open plate 20 in the unlocking direction to the unlocking operation of the reclining lock mechanism 74.

In addition, the outer side seat reclining apparatus 10 employs a configuration of transmitting the operation force in the unlocking direction from the open plate 20 to the reclining lock mechanism 14 via the linking lever 18, and includes between the open plate 20 and the linking lever 18 the rotation transmission portion 20*e* and the transmission arm 18*c* that transmit the rotation force to the linking lever 18 after the open plate 20 rotates by a predetermined amount toward the unlocking direction. The linking lever 18 is directly connected with the reclining lock mechanism 14 via the hinge pin 15, so that the rotation of the linking lever 18 transmits to the reclining lock mechanism 14 without play.

According to the above configuration, the outer side and inner side reclining lock mechanisms 14 and 74 to which the operation force in the unlocking direction is transmitted under different conditions (force transmission members or force transmission routes) can be interlocked at an appropriate timing and caused to reliably perform unlocking. Particularly when the lock release handle 6 and the walk-in operation lever 7 arranged on the outer side are operated, there is no risk that the inner side reclining lock mechanism 74 causes a failure that the unlocking operation significantly delays or is not finished, so that it is possible to provide a good operation response and high safety.

The configuration only includes on the outer side the rotation transmission portion 20*e* and the transmission arm 18*c* that include the predetermined interval in the rotational direction. Consequently, it is possible to easily realize the above effect at low cost without a substantial increase in the number of parts and with little change to an existing structure.

In this regard, when the outer side and inner side reclining lock mechanisms 14 and 74 have a common specification (the operation amount during unlocking), by making a timing to start rotating the linking lever 18 in the unlocking direction on the outer side and a timing to start rotating the open plate 73 in the unlocking direction on the inner side coincide, it is possible to substantially completely synchronize the operations of the reclining lock mechanisms 14 and 74 on the both sides. This timing adjustment can be configured according to the interval between the rotation transmission portion 20*e* and the transmission arm 18*c* in the locked state. According to the present embodiment, the reclining lock mechanisms 14 and 74 have the common specification, and the timings to start rotating the outer side linking lever 18 and the inner side open plate 73 in the unlocking direction are configured to substantially coincide.

The open plate 20 and the linking lever 18 are rotatably supported coaxially by the hinge pin 15, and consequently can be disposed efficiently in a space and easily receive the force transmitted in the rotational direction. Particularly, the rotation transmission portion 20*e* and the transmission arm 18*c* are configured to come into contact with each other via surfaces of the open plate 20 and the linking lever 18 confronting each other in the rotational direction, and consequently can transmit the force in the rotational direction without waste and provide good operation efficiency.

Furthermore, the open plate 20 includes the return regulating portion 20*f* that can come into contact with the transmission arm 18*c* from the direction opposite to the rotation transmission portion 20*e*. When the operation of the open plate 20 in the unlocking direction is released in a state where the seat back 5 tilts forward and the reclining lock mechanisms 14 and 74 are unlocked as illustrated in FIG. 12, the return regulating portion 20*f* comes into contact with the transmission arm 18*c* and regulates the rotation of the open plate 20 to the locking position (the open plate 20 is held at the return regulating position). Consequently, the linking cable 58 does not become slack unnecessarily, so that it is possible to prevent the linking cable 58 from interfering with the other members.

The present invention has been described based on the illustrated embodiment above. However, the present invention is not limited to the illustrated embodiment, and can be improved and modified without departing from the scope of the invention.

For example, the configuration where the open plate 20 and the linking lever 18 are coaxially supported provides the above-described advantage. However, two rotation members corresponding to the open plate 20 and the linking lever 18 can be also disposed such that positions of rotation centers of the rotation members are different. More specifically, it is possible to arrange the rotation center of the open plate 20 at a position eccentric from the hinge pin 15.

Rotation transmission portions provided to the two rotation members corresponding to the open plate 20 and the linking lever 18 can be also selected from components other than the rotation transmission portion 20*e* and the transmission arm 18*c* according to the embodiment. For example, an elongate hole extending in the rotational direction can be formed in one of the two rotation members, a protrusion portion to be inserted in the elongate hole can be formed in the other one of the two rotation members, and the elongate hole and the protrusion portion can constitute the rotation transmission portion. In this case, one of the elongate hole and the protrusion portion is the interlinking portion of the second rotation member. The protrusion portion is located apart from an end portion of the elongate hole in the locked state. When the locked state transitions to the unlocked state, the end portion of the elongate hole comes into contact with the protrusion portion and transmits a force in the unlocking direction.

According to the illustrated embodiment, when the operations of the lock release handle 6 and the walk-in operation lever 7 are released in a state where the seat back 5 is tilted to the unlocking range U, the return regulating portion 20*f* formed in the open plate 20 comes into contact with the transmission arm 18*c* of the linking lever 18, and regulates the open plate 20 from rotating to the unlocking position (FIG. 4) (see FIG. 12). Different means from these members can regulate the open plate 20 from rotating to the unlocking position, and the open plate 20 can be configured not to include the return regulating portion 20*f*.

The present invention is applicable to a type of seats, too, that do not perform a so-called walk-in operation of unlocking slide lock of a seat track while tilting a seat back forward. When the walk-in operation is not performed, the operation of the slide lock operating cable 62 according to the above embodiment is unnecessary.

Furthermore, according to the above embodiment, the intermediate stop position 5B and the folded-down position 5C can be selected as a forward tilting position of the seat back 5. However, the unlocking range U (FIG. 1) of the seat back is applicable to a type of seats, too, that do not include a plurality of these forward tilting positions. For example, according to a type of a seat that is tilted forward the most at the intermediate stop position 5B without being tilted forward to the folded-down position 5C, the stopper pin 24 can be a fixed portion instead of a movable portion.

Furthermore, an embodiment may also employ only a minimum configuration where the reclining lock mechanisms 14 and 74 on the both sides of the seat are interlocked without performing any one of the walk-in operation and the fold-down operation according to the above embodiment. More specifically, the outer side seat reclining apparatus employs a configuration including the lock release handle 6, the linking lever 18 and the open plate 20 without the walk-in operation lever 7, the fold-down operation lever 8 and the intermediate stop lever 21 (stopper pin 24).

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A seat reclining apparatus mounted on a vehicle seat comprised of a seat back and seat cushion, said seat reclining apparatus comprising:
   a first reclining lock mechanism and a second reclining lock mechanism that operate in a locked state and an unlocked state, said locked state preventing said seat back from tilting with respect to said seat cushion and said unlocked state allowing said seat back to tilt with respect to said seat cushion;
   a first rotation member that connects with said first reclining lock mechanism via a shaft body interposed therebetween, and rotates from a locking position toward an unlocking direction together with said shaft body to change said first reclining lock mechanism from said locked state to said unlocked state;
   a second rotation member that is operated to rotate by an operation member, and rotates from a locking position toward an unlocking direction to change said second reclining lock mechanism from said locked state to said unlocked state via a cable,
   wherein said second rotation member is provided with an interlocking portion,
   wherein when said operation member is operated, said second rotation member rotates from said locking position toward said unlocking direction by a predetermined amount, subsequently transmits a rotation force to said first rotation member via said interlocking portion to rotate said first rotation member toward said unlocking direction,
   said first reclining lock mechanism being provided at one side of said seat in a vehicle-width direction; and
   said second reclining lock mechanism being provided at an other side of said seat in the vehicle-width direction, said one side of the said seat and said other side of said seat being opposites sides of said seat in a vehicle-width direction.

2. The seat reclining apparatus according to claim 1, wherein said shaft body passes through said second rotation member so that said second rotation member is rotatably supported by said shaft body in a manner that said second rotation member and said shaft body are rotatable relative to each other.

3. The seat reclining apparatus according to claim 1, further comprising a force transmission portion that is provided to said first rotation member and to which the rotation force in said unlocking direction is transmitted from said interlocking portion,
   wherein, when said first rotation member and said second rotation member are positioned at said locking positions, respectively, said force transmission portion is apart from said interlocking portion.

4. The seat reclining apparatus according to claim 1, wherein said shaft body is positioned at a rotational center of said first reclining lock mechanism.

* * * * *